Feb. 19, 1957 O. K. KELLEY ET AL 2,781,858
VEHICLE DRIVING AND STEERING TRANSMISSION
AND HYDRAULIC CONTROL THEREFOR
Filed June 17, 1952 10 Sheets-Sheet 1
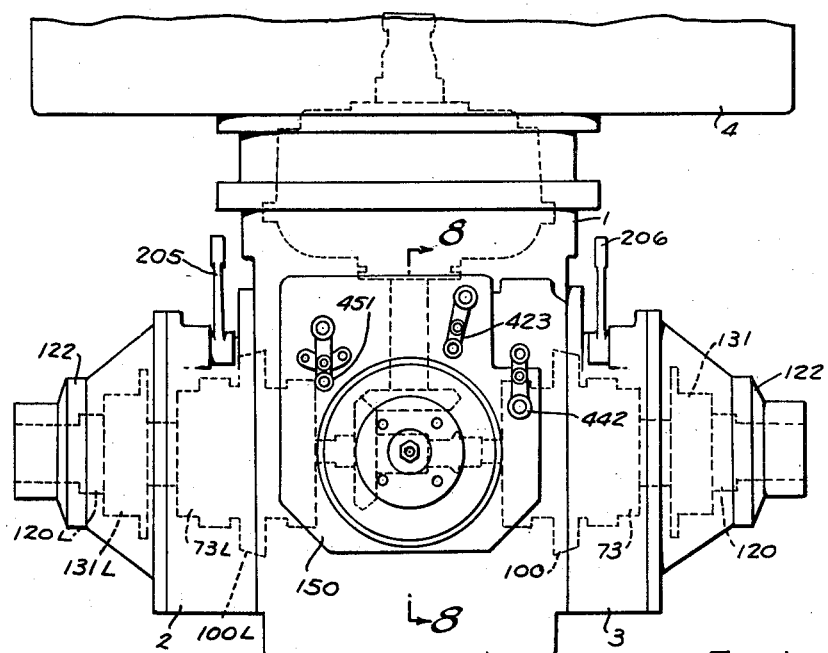
FIG. 1.
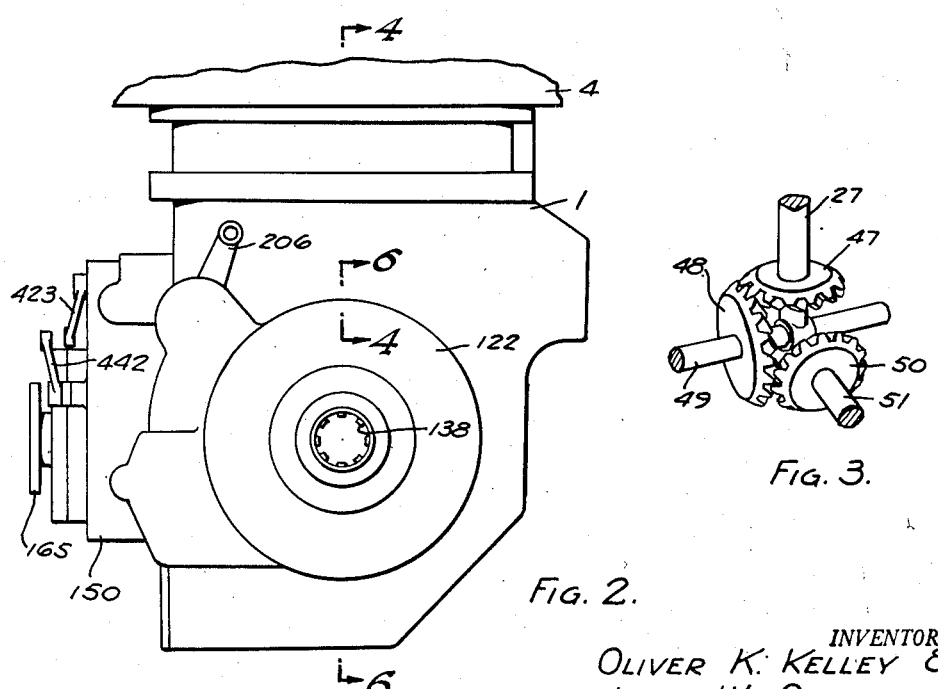
FIG. 2.
FIG. 3.
INVENTORS
OLIVER K. KELLEY &
JACK W. QUALMAN
BY Barnes, Kisselle, Laughlin & Raisch
ATTORNEYS.

INVENTORS
OLIVER K. KELLEY &
BY JACK W. QUALMAN
Barnes Kisselle Laughlin & Raisch
ATTORNEYS.

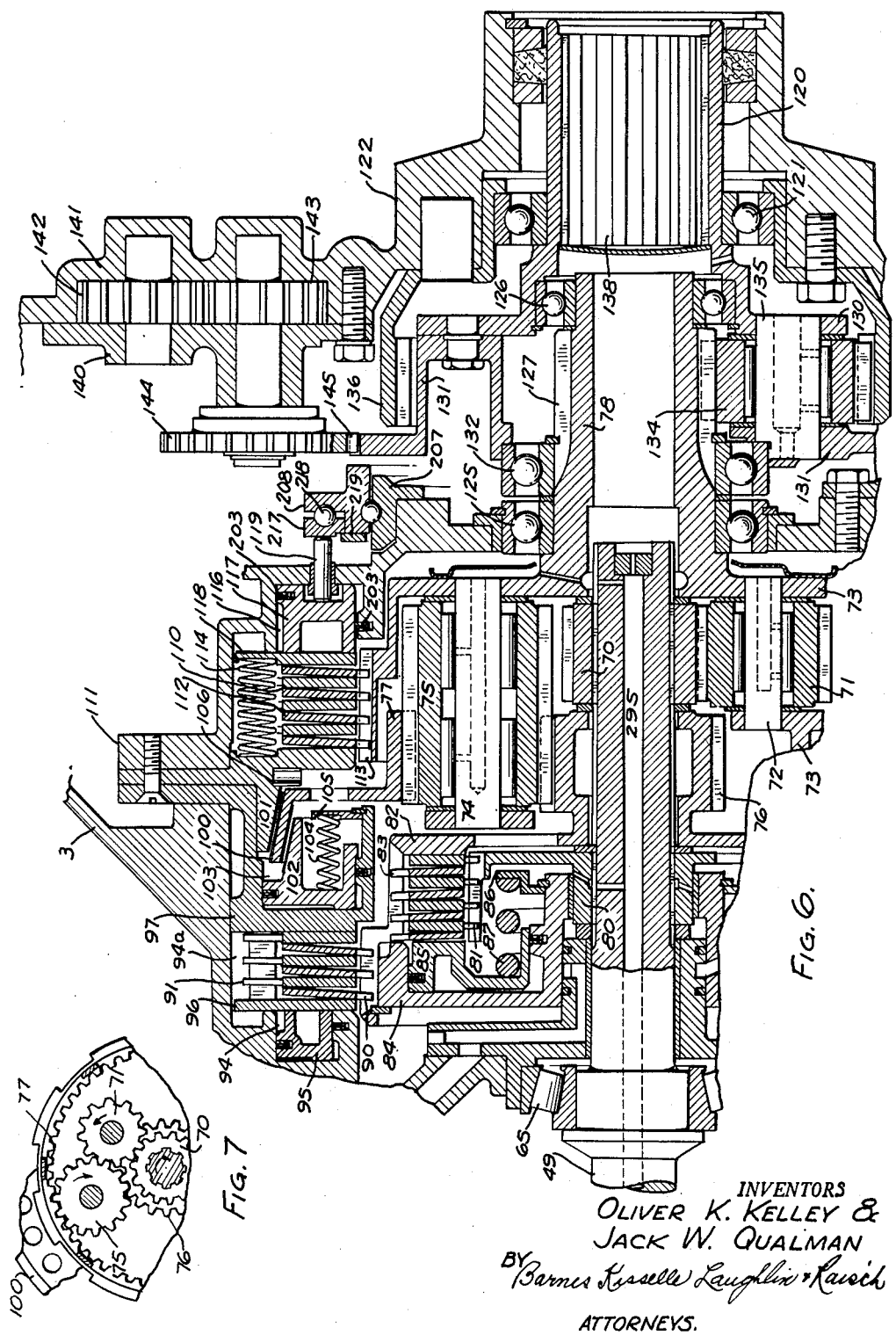

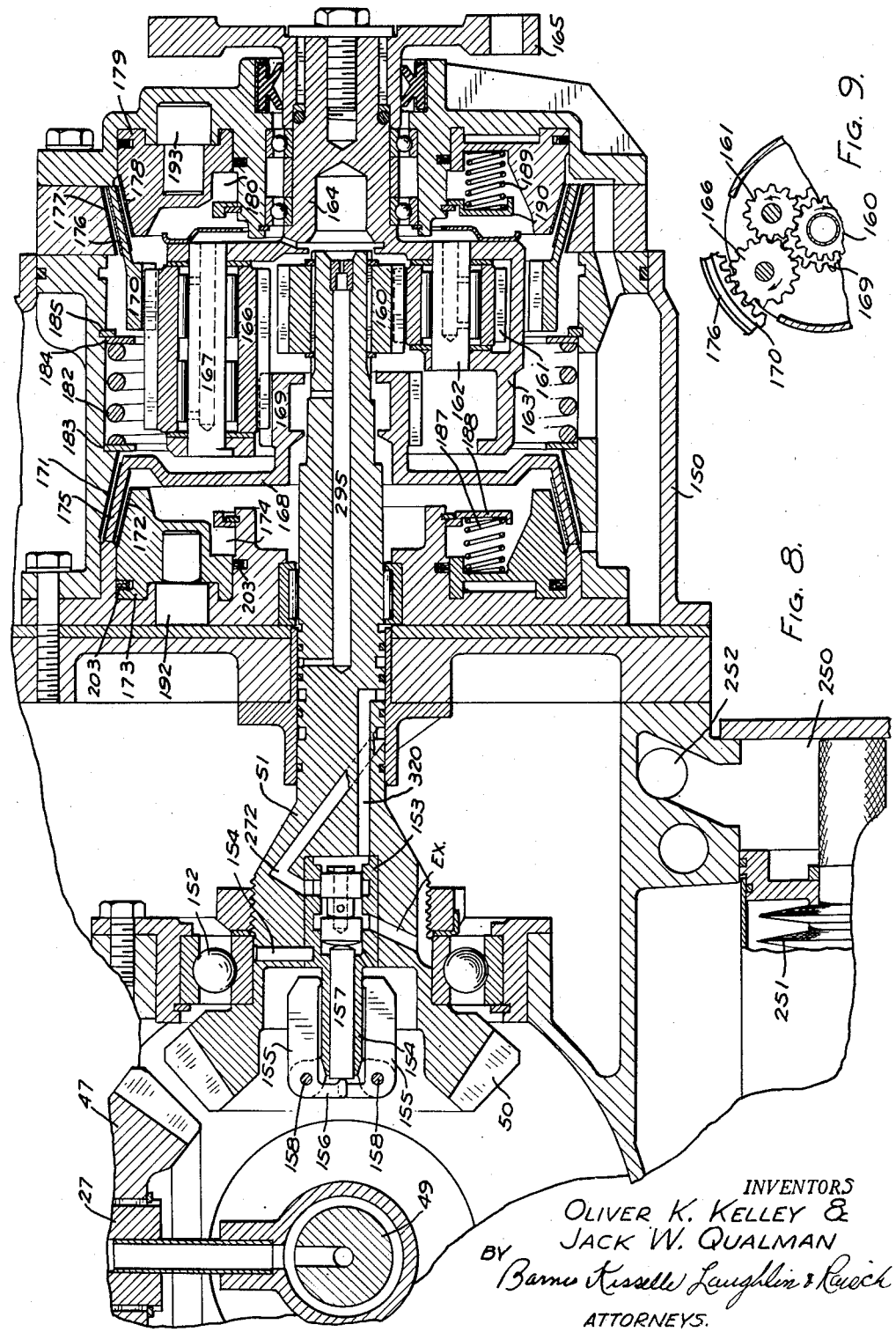

Feb. 19, 1957 O. K. KELLEY ET AL 2,781,858
VEHICLE DRIVING AND STEERING TRANSMISSION
AND HYDRAULIC CONTROL THEREFOR
Filed June 17, 1952 10 Sheets-Sheet 5
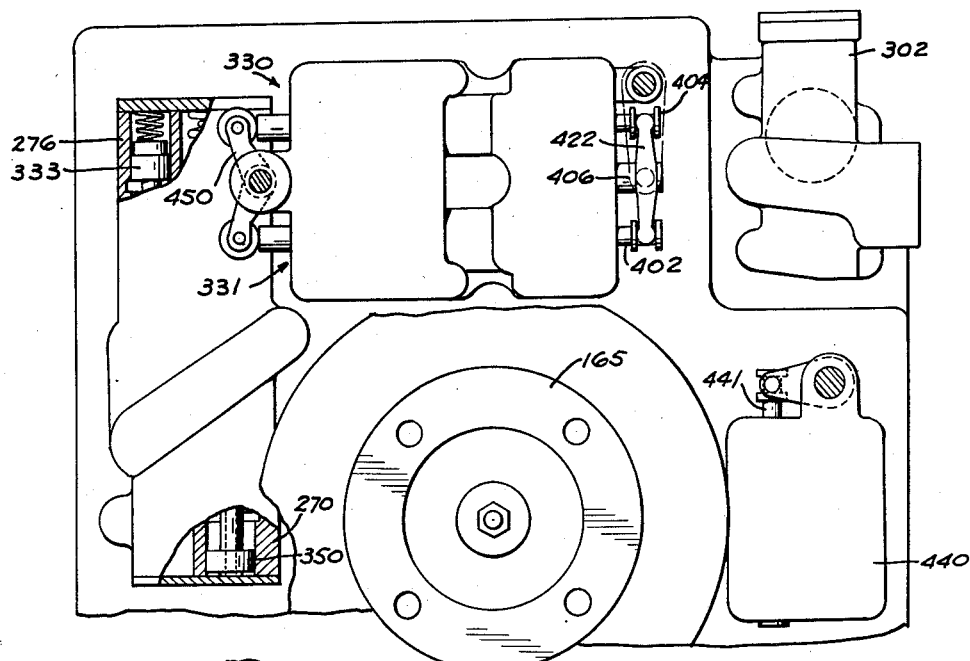
FIG. 10.
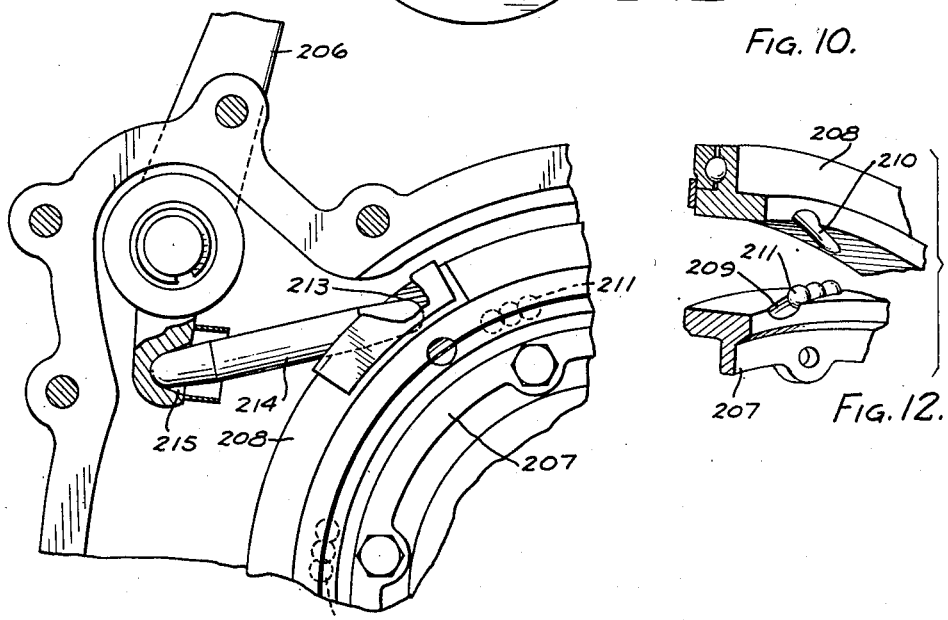
FIG. 11.
FIG. 12.
INVENTORS
OLIVER K. KELLEY &
JACK W. QUALMAN
BY Barnes Kisselle Laughlin Raisch
ATTORNEYS.

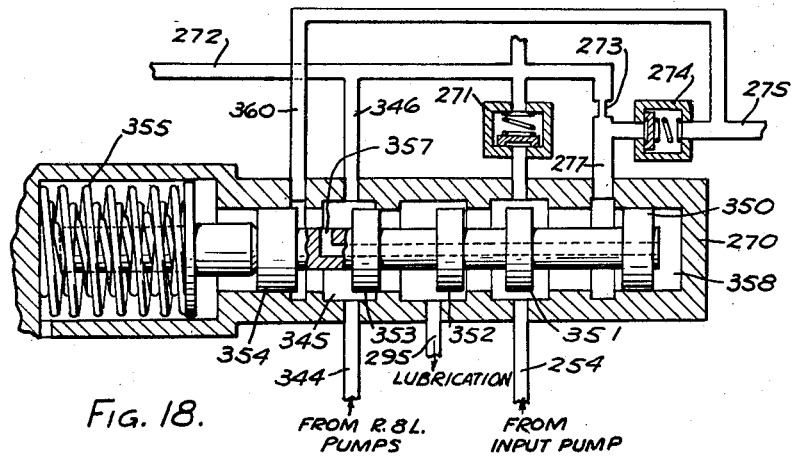
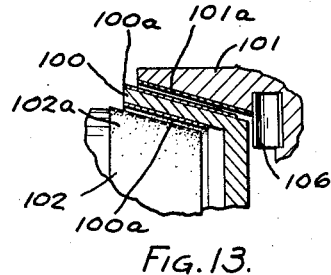
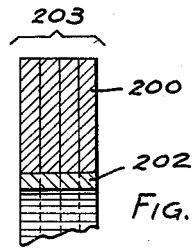
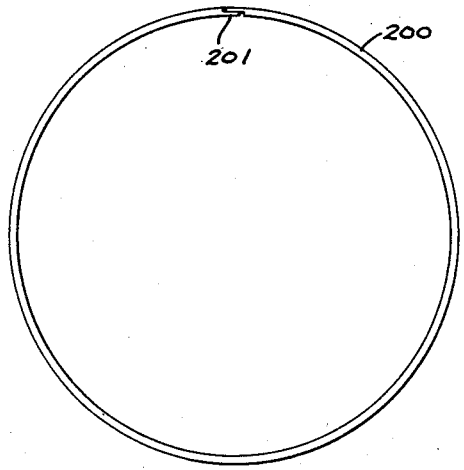
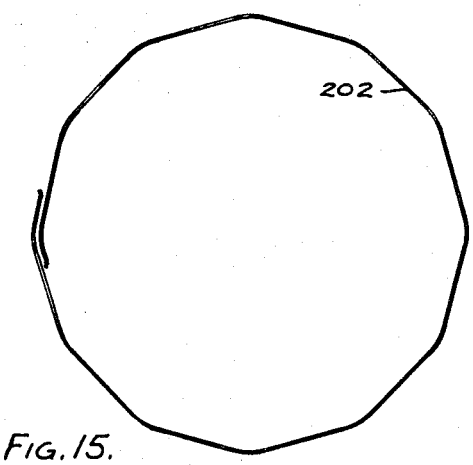

INVENTORS
OLIVER K. KELLEY &
JACK W. QUALMAN
BY Barnes Kisselle Laughlin & Raisch
ATTORNEYS.

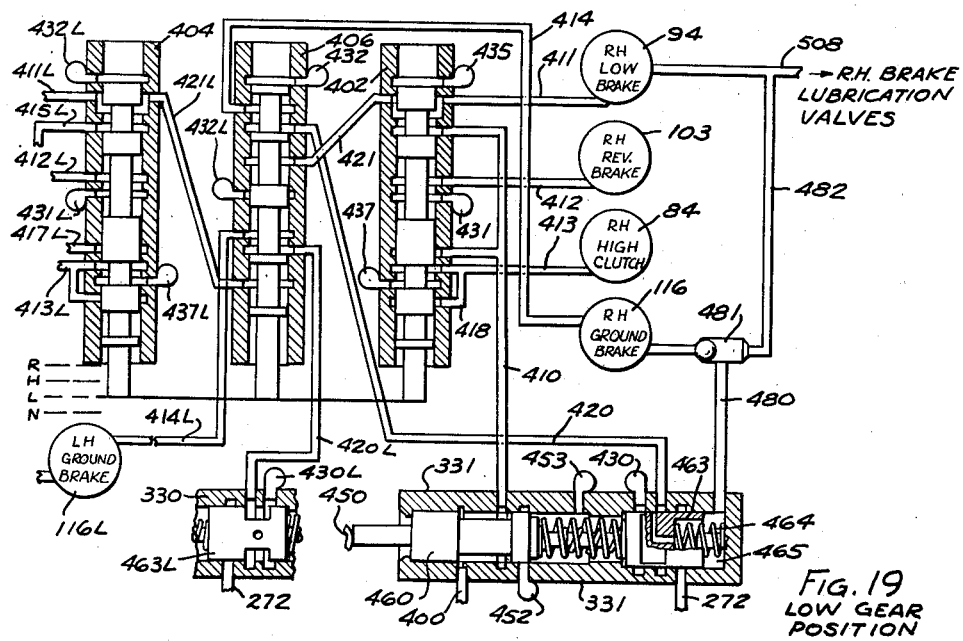
FIG. 19
LOW GEAR POSITION
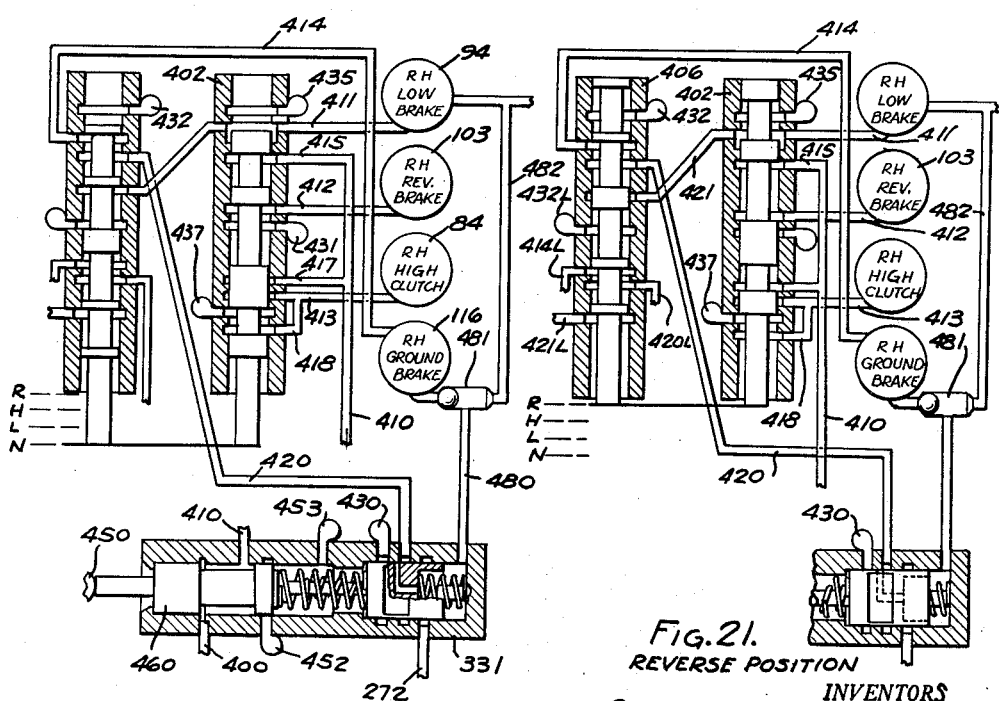
FIG. 20
NEUTRAL POSITION
FIG. 21.
REVERSE POSITION
INVENTORS
OLIVER K. KELLEY &
JACK W. QUALMAN
BY
Barnes Kisselle Laughlin & Raisch
ATTORNEYS.

STEERING TO THE RIGHT IN LOW GEAR

STEERING TO THE RIGHT IN HIGH GEAR

LUBRICATION TO THE LOW
BRAKE DURING ENGAGEMENT

LUBRICATION TO THE
GROUND BRAKE WHILE
ENGAGING

INVENTORS
OLIVER K. KELLEY &
JACK W. QUALMAN
BY
ATTORNEYS.

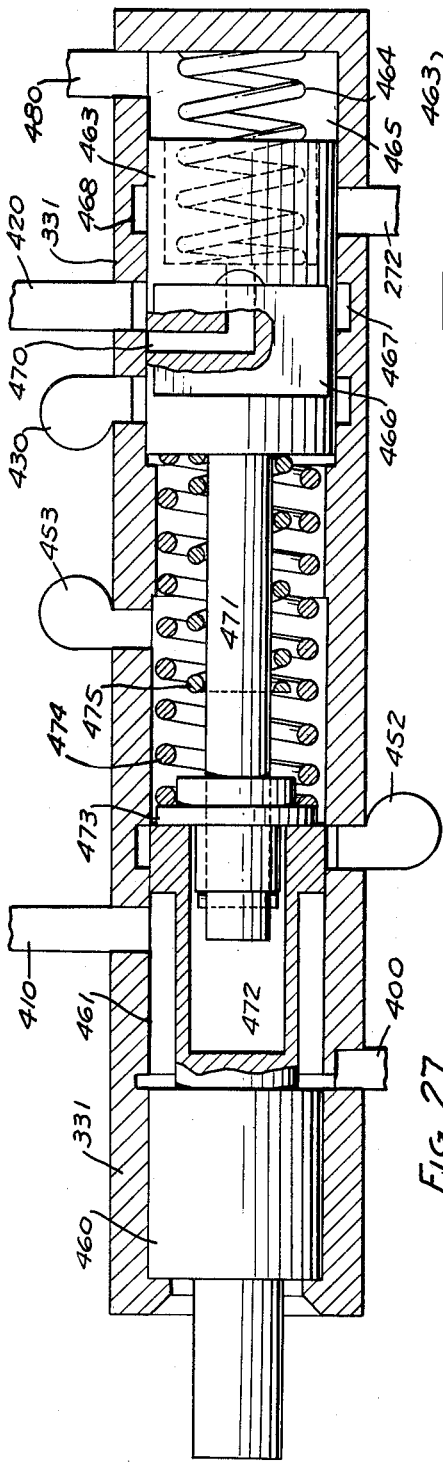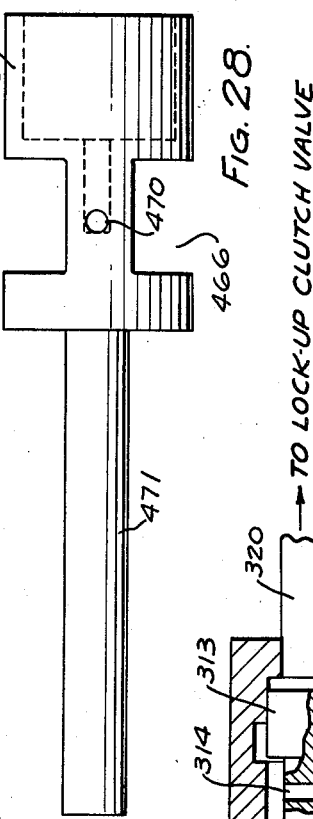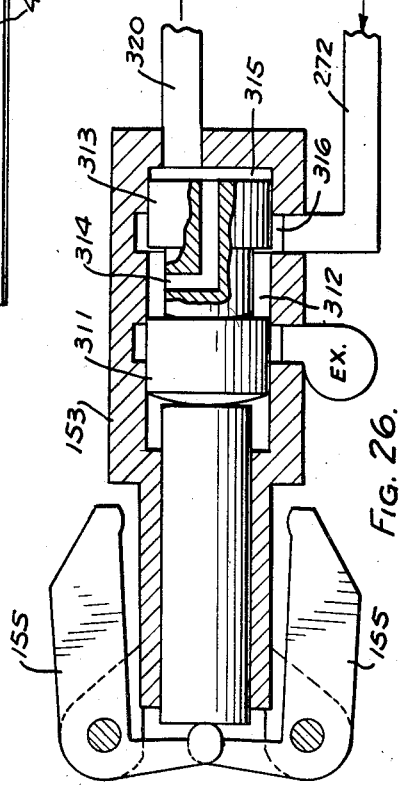

ated Feb. 19, 1957

2,781,858

VEHICLE DRIVING AND STEERING TRANSMISSION AND HYDRAULIC CONTROL THEREFOR

Oliver K. Kelley and Jack W. Qualman, Birmingham, Mich., assignors to General Motors Corporation, Detroit, Mich., a corporation of Delaware Application June 17, 1952, Serial No. 293,982

12 Claims. (Cl. 180—6.7)

This invention relates to a transmission particularly for the purpose of transmitting torque from an engine to the driven ground engaging elements of a vehicle. The transmission of the present invention is particularly arranged to drive the right hand and left hand elements of a track laying vehicle which may be a form of tractor or a form of military vehicle which may be a variety of so-called tank or a cargo carrier arranged to be operated on land or in water.

To these ends, the transmission of the present invention is disclosed and described in relation to its assembly with such a track laying vehicle, and more particularly, it is disclosed so that it sits in what may be termed a vertical position with the engine mounted above the same and with the engine and the transmission having each a vertically disposed or substantially vertically disposed drive shaft. More particularly, some features of the invention are directed to the provision of a light weight transmission wherein many of the parts are made with aluminum or aluminum alloy and thus the transmission is admirably adapted for an airborn vehicle.

The invention aims to provide a transmission which has, as above mentioned, a main power input shaft which may be disposed vertically and a cross shaft which may extend substantially horizontally. The transmission has a power output member at opposite sides each associated with opposite end portions of the cross shaft, and each arranged to operate the propelling mechanism of the vehicle. The transmission is of a double nature in that there is gearing between the cross shaft and each power output member for transmitting the torque at a relatively high gear ratio, a relatively low gear ratio, for transmitting the torque in reverse and for transmitting no torque when in neutral position. The transmission also involves braking means embodied therein.

In addition to the gearing, the main shaft of the transmission is coupled to the engine by means of a fluid type torque converter, and in conjunction with the torque converter is a lock up clutch which functions to establish a direct connection between the engine and the transmission so that under certain conditions the torque converter is not used to transmit torque.

The invention aims to provide a control mechanism of a hydraulic nature which has certain automatic features involved in it. Included in this operation is an arrangement wherein the lock up clutch automatically becomes engaged substantially at a predetermined vehicle speed upon acceleration and disengages at a lower vehicle speed upon deceleration, it being appreciated that the speed of the vehicle, where this automatic action takes place, is dependent upon whether the torque is transmitted through the transmission in high gear ratio or low gear ratio. The lock up clutch will engage and disengage under other conditions; it will so function when the transmission is operating the power take off, when it is in neutral, and also when it is operating in reverse. Friction devices are employed to establish conditions in the transmission where the torque is transmitted in high gear ratio, low gear ratio, and reverse, and also for establishing a braking condition which, in effect, applies a brake to the vehicle propelling mechanism. The hydraulic control system is operative upon these friction devices to release one while engaging another and thus the transmission does not embody the making and breaking of dental engagements since all gears or other toothed elements remain in engagement at all times.

The invention aims to provide an improved control mechanism whereby the vehicle may be steered to turn it to the right or to the left. This is done while the vehicle is being operated in the high ratio by dropping the power output on one side to the lower ratio. Thus the tracks of the vehicle operate at different speeds resulting in turning of the vehicle. In this action, the engagement of the low ratio brake may be controlled so that there is a more or less substantially determined amount of slippage to thus determine the sharpness of the angle of the turning of the vehicle or the low ratio brake may be completely engaged to cause the vehicle to turn on a fixed radius. The vehicle is also steered when operating in the low range and this is done by applying the brake on one side or the other depending on whether the vehicle is to be turned to the right or left, and at that time releasing the low range driving brake on the same side of the transmission. Steering in reverse is similar in that the brake is applied on one side of the transmission and the reverse driving brake is released. Here again this brake may be caused to slip in a controlled fashion to determine the sharpness of the angle of the turn or it may be locked up completely to hold the track on one side of the vehicle stationary for a sharp turning angle.

It is a further object of the invention to lubricate the friction elements when they are slipping as above described to prevent undue wear thereof. At the same time, however, the lubrication to some of the frictional engaging elements is discontinued when those elements are to be completely engaged in non-slipping manner.

While the invention is disclosed as a transmission particularly designed for a track laying vehicle, it is to be understood that some features of the invention may be employed in transmissions for other purposes. A transmission constructed in accordance with the invention is shown in the accompanying drawings:

Fig. 1 is a view largely in elevation showing the transmission case, with some of the contained mechanism indicated by broken lines, and generally indicating some of the controls.

Fig. 2 is an elevational view taken from the right hand side of Fig. 1.

Fig. 3 is a detailed perspective showing driving gears.

Fig. 6 is an enlarged sectional view taken substantially on line 6—6 of Fig. 2, illustrating the right hand driving mechanism, including planetary gear sets and clutches.

Fig. 7 is a sectional view illustrating a planetary gear arrangement.

Fig. 8 is a sectional view of enlarged form taken substantially on section line 8—8 of Fig. 1 showing a power takeoff mechanism.

Fig. 9 is a detailed view illustrating a planetary gear arrangement in the power takeoff mechanism.

Fig. 10 is a view of a part of the transmission housing with some parts cut away and some parts in section, and illustrating the structure of and location of some of the controlling elements.

Fig. 11 is a detailed view with some parts in section illustrating the mechanism of a manually operated brake.

Fig. 12 is a broken perspective view with some parts in section showing the structure of the manually operated brake.

Fig. 13 is an enlarged cross sectional view illustrating one of the cone type clutching elements.

Fig. 14 is a view illustrating a piston ring element.

Fig. 15 is a view illustrating an expander ring for piston rings.

Fig. 16 is a cross sectional view of a unit composed of several piston rings and an expander ring.

Fig. 18 is an enlarged view of the main line regulator valve.

Fig. 19 is a view of the three manual control valves showing the same in position for the transmission of torque in the low speed ratio.

Fig. 20 is a view similar to Fig. 19 showing manual control valves in a neutral position.

Fig. 21 is a diagrammatic view similar to Figs. 19 and 20 showing manual control valves set in a position for transmitting torque in reverse direction.

Fig. 26 is an enlarged detail view, largely in section, illustrating the centrifugal and hydraulic governor for controlling the lock up clutch.

Fig. 27 is an enlarged detail sectional view illustrating the right hand steering valve.

Fig. 28 is a view illustrating a valve member of the right hand steering valve.

Figure 4:
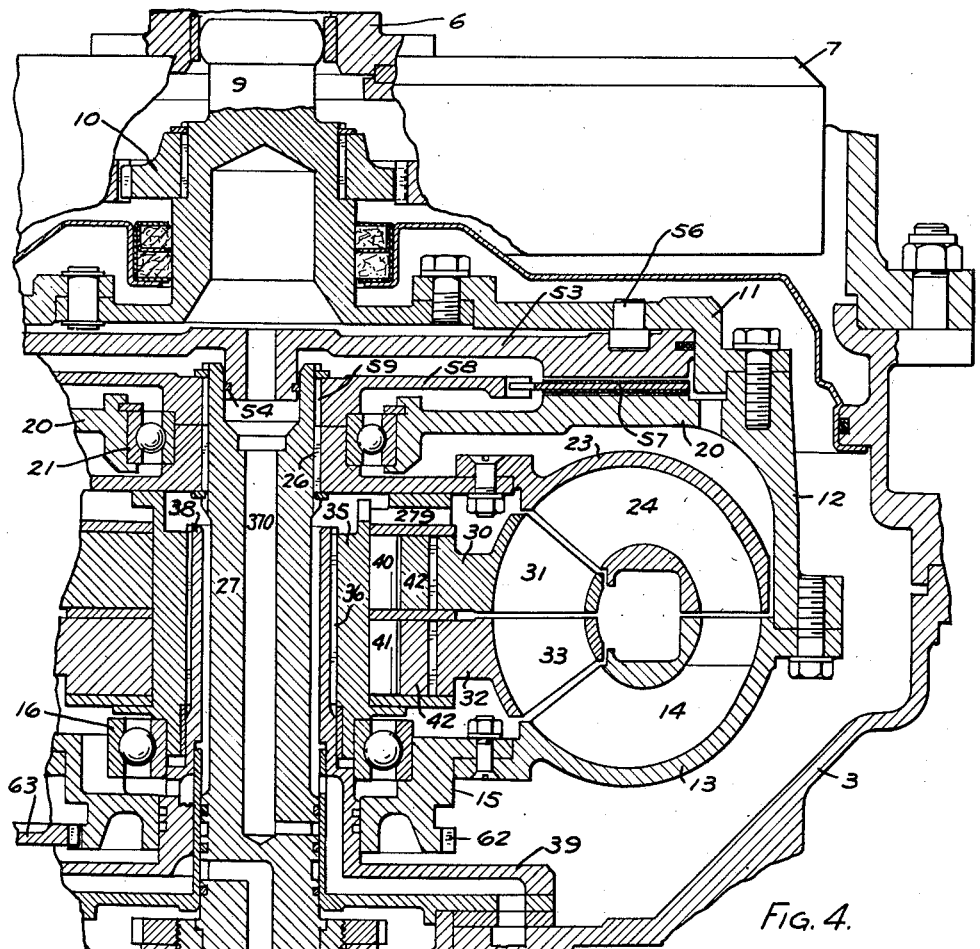
Fig. 4 is an enlarged sectional view taken substantially on line 4—4 of Fig. 2 illustrating the power input elements, the torque converter and the vertically disposed drive shaft and lock up clutch.

It will be observed, by considering Fig. 1, that the transmission has a central housing portion generally illustrated at 1 and oppositely extending lateral portions 2 and 3. The transmission, as shown herein, is one which can conveniently be disposed in a vertical position, so to speak, with the engine positioned above the transmission housing and the engine is illustrated at 4. The vertically disposed crank shaft of the engine is shown at 6 in Fig. 4 and the fly wheel of the engine is at 7. A drive member of the transmission, illustrated at 9, is connected to the engine through the means of an intermediate part 10 to be driven thereby. Secured to the member 9 is the housing of a pump or impeller member of a fluid torque converter. This housing, includes a part 11, which forms a cylinder, an intermediate part 12, a shell part 13, with blades 14, and a portion 15 mounted on a bearing generally illustrated at 16. There is a friction clutch driving member 20 mounted on a bearing 21 and which may be integrally formed with the intermediate housing part 12 to thus turn with the engine shaft.

The driven member or turbine of the torque converter is shown at 23 with blades 24 and it has an inner part splined as at 26 to a shaft 27 of the transmission which may be termed the input shaft.

Figure 5:
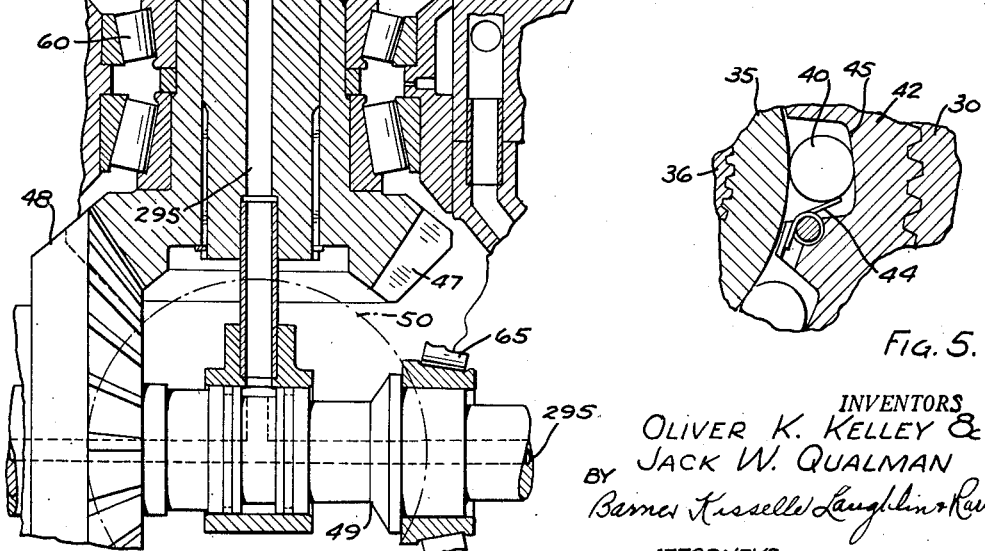
Fig. 5 is a detailed enlarged sectional view showing an overrunning clutch arrangement for the stators of the torque converter.

The torque converter illustrated is of a type having two stators each provided with blades. One stator is illustrated at 30 having blades 31. The other stator is shown at 32, having blades 33. The impeller, the turbine and the stators cooperate to form an annular torus chamber. There is a race member 35 splined as at 36 to an anchor member 38 having an outwardly extending flange portion 39 secured to the housing. Each stator is associated with the race 35 through an overrunning clutch arrangement, each embodying a series of rollers 40 and 41, positioned in recesses in ring members 42, between the stators and the race 35. Each roller is actuated upon by a spring 44 to urge the same into tight engagement between the external surface of the race 35 and the bottom of the recess in member 42, the bottom of the recess as shown at 45 being so positioned that the recess has a lesser depth on the side toward which the roller is urged by the spring. Thus, each stator may rotate relative to the anchor race 35 when the direction of movement is counter-clockwise as Fig. 5 is viewed, but the stators cannot rotate clockwise relative to the anchor race 35.

It will be understood by those familiar with the art, that when the torus chamber is supplied with a liquid medium, hereinafter conveniently referred to as oil, and the pump member is caused to rotate, that torque is transmitted to the input shaft 27. Briefly, it might be stated that the oil circulates from the pump to the turbine and from the turbine to the first stator, then to the second stator returning to the pump. The driving force is imparted to the oil by the pump blades. Part of the power creates the circulation pressure and the other part furnishes a forward spinning momentum to the oil. The spinning momentum is arrested by the turbine which delivers the power to the shaft 27. When the turbine rotates at low speed it completely reverses the forward spinning momentum into a reverse spinning momentum. As the oil leaves the turbine this reverse spinning momentum is caught by the first stator which converts it into axial flow without any spin. The second stator receives this axial flow and converts it to a rotating forward spin before it discharges the oil to the pump. As the turbine speed increases, the reverse spinning momentum of its discharge decreases until, at a certain turbine speed, the discharge has a zero spin. At this point, the first stator begins to free wheel or overrun the anchor race, while the second stator is still performing its task of adding forward spin to the oil. As the turbine speed continues to increase, the reverse spinning momentum changes to a forward spinning momentum. At a certain point, the forward spin from the turbine discharge is equal to the spin delivered by the second stator's exit and then the second stator begins to free wheel or, in other words, overrun the anchor race.

The drive shaft 27 has on one end thereof, which is the lower end, when the shaft is positioned vertically as shown, a bevel gear 47 (Figs. 3 and 4). This bevel gear has its teeth meshing with a bevel gear 48 on a cross shaft 49. Another bevel gear 50 has its teeth meshing with those of the bevel gear 48 and this gear is mounted on a power takeoff shaft 51 extending at right angles to the cross shaft 49.

Positioned in the cylinder formation of the member 11 is a piston 53 and this piston has a sealed and sliding connection with the shaft 27 as indicated at 54 and it is slidably mounted on the member 11 as shown at 56 so as to be driven thereby. Positioned between the piston 53 and the driving member 20 is a clutch disc 57 having a hub portion 58 splined or keyed to the shaft 27 as shown at 59. It will be appreciated that if this friction clutch be engaged the torque is transmitted directly through the friction clutch to the shaft 27.

It is, of course, obvious that the structure involves numerous details of construction, such, for example, as the bearing 60 for the shaft 27 and its pinion 47; that various parts have passageways therein for the flow of oil as will presently appear in more detail and that the parts are assembled and held positioned by various elements, such as cap screws, lock rings, etc.; and that certain sealing elements are involved. While these appear in the drawing, it is believed that it is better for the purpose of clarity that these features be not described in great detail.

The driving member 15 has a gear formation thereon as at 62, the teeth of which mesh with a pump drive gear 63. This pump will be considered in more detail later.

The cross shaft 49 extends from right to left, as Fig. 1 is viewed, and opposite parts of the cross shaft are associated with driving, braking and ratio changing mechanism disposed in the opposite housing portions 2 and 3. The mechanism on one side is the same as the mechanism on the other end. Therefore, it is considered to be adequate to describe only one side. In Fig. 6 the right hand side of the mechanism is illustrated and it will be noted that the drive shaft 49 is journaled in a bearing 65. By placing Fig. 6 in a position so that the shaft 49 is in line with the shaft 49, as shown in Fig. 4, so that the bearing 65, shown in both views, may be seen, the relationship of the input shaft 27 and associated mechanism and the shaft 49 and associated mechanism, can readily be seen.

A planetary gear assembly is associated with the shaft 49 for effecting a low ratio drive, a direct drive, and a reverse drive. To this end, there is an input sun gear 70 splined to the shaft 49 and its teeth mesh with the teeth of a set of short pinions 71. These pinions are journaled on axes 72 mounted in a carrier 73. Also mounted in a carrier on axes 74 is a set of three long pinions 75. By describing the pinions as short and long we refer to the axial length thereof. The teeth of the long pinions mesh with those of the short pinions and also the teeth of the long pinions 75 also mesh with the teeth of a low ratio sun gear 76 and with the teeth of an internal gear or ring member 77. The carrier 73 has an extension 78 which transmits the drive.

For the purpose of effecting different conditions in the function of the planetary gear set, friction devices such as clutches and brakes are provided. The clutch for the high speed ratio includes a member 80 splined to the shaft 49 and which is provided with a plurality of clutch discs 81. The low ratio sun gear 76 has a body portion 82 with a plurality of clutch discs 83 alternately arranged with the clutch discs 81. Positioned within the body portion 82 is a cylinder member 84 provided with a piston 85 for acting upon the clutch discs to pack them together. A reaction member 86 backs up a coil spring 87 and which acts upon the piston 85 to normally hold the piston retracted in the cylinder with the clutch discs disengaged. It will be appreciated that if the piston 85 is shifted to the right, as Fig. 6 is viewed, to engage the clutch discs 81 and 83, that the two sun gears 70 and 76 are locked together and locked to input shaft 49. Therefore, there can be no turning of the pinions on their respective axes and the carrier 73 and its output end 78 is caused to rotate at a 1:1 ratio with the shaft 49.

The brake for the low ratio includes discs 90 mounted on the body part 82 of the low range sun gear 76 and interleaved discs 91 mounted on the housing 3. The housing 3 is formed with a cylinder 94 in which there is a piston 95 for acting upon the discs 90 and 91 to pack them together. The end disc member next to the piston 95 is relatively large as shown at 96, and the discs are normally held separated by spring means (not shown) positioned between the disc 96 and a member 97 which is fixed to the housing.

When the brake discs 90 and 91 are packed together the low sun gear 76 is held stationary. At this time with the shaft 49 turning, for example, clockwise, as Fig. 7 is viewed, the sun gear 70 is turning clockwise thus rotating the short pinions 71 on their axes counter-clockwise. The short pinions rotate the long pinions 74 clockwise and since the teeth of the long pinions mesh with the now stationary sun gear 76, the long pinions 74 revolve around the sun gear 56 thus compelling the carrier 73 to revolve in the same direction but more slowly than the shaft 49.

The reverse brake is of the cone type. The ring gear 77 has a frusto-conical portion 100 provided with facing material as shown and positioned between the internally coned face of a fixed member 101 and the externally coned face of a piston 102. The piston is mounted in a cylinder 103 formed in the member 97. The piston 102 is held retracted by springs 104. When the piston 102 is caused to shift to the right and engage the cone brake, the ring gear member 77 is held stationary. Now when the sun gear 70 rotates in a clockwise direction, as above described, the short pinions 71 are rotated counter-clockwise and the long pinions are caused to rotate clockwise. Of course, at this time the sun gear 76 is free and since the ring gear 77 is held stationary and cannot be turned by the long pinions, the long pinions revolve around the internal gear 77 in a direction reverse to that of the rotation of the shaft 49 and sun gear 70. This compels the carrier to rotate in the reverse direction. The piston 102 is, in released position, held retracted by springs 104 which react on a washer 105. There is an annular wavy or corrugated spring 106 positioned back of the cone brake member 100. This spring insures that the cone member 100 will be disengaged from the member 101 when the piston 102 retracts. As the facings wear in use, the position of the cone member 100, when the brake is engaged, will gradually shift to the right, and the spring 106 flexes to permit this action.

There is a brake construction associated with the carrier 73 and this brake, as will presently be seen, is also used for steering purposes. The brake is provided with a plurality of discs 110 fixed to a housing member 101 and a plurality of discs 112 interleaved with discs 110 and mounted on the carrier 73 as shown at 113. These discs are normally held separated and disengaged by springs 114. The housing member 111 is formed with an annular cylinder 116 in which is a piston 117. This piston engages the end member 118 and when it shifts to the left as Fig. 6 is viewed, the discs are packed into engagement. This brake and steering device may also be engaged mechanically by manually operated means and to this end a plurality of pins 119 are slidably mounted in the housing member and positioned to engage and shift the piston 117. This matter will be treated in more detail later.

The final drive member is illustrated at 120 and it is journalled on a bearing as at 121 in a cap plate 122 for the housing. There is a reduction in the final drive system, however, in the form of a planetary gear set. This gear set is located between the carrier 73 and the final drive member 120. The extension 78 of the carrier is journalled as at 125 and 126 and it is formed with gear teeth 127. The final drive member 120 has a flange 130 secured to a ring member 131 which is supported by a bearing 132. These two members 130 and 131 are formed to provide a carrier for planetary pinions 134 mounted on pins 135. The teeth of these pinions mesh with the teeth 127 of the extension 78 and with the teeth of an internal gear 136 which is fixed to the housing as shown. Since the internal gear 136 is fixed and does not rotate, the pinions 134 in turning on their axes revolve about the ring gear and compel the final output member 120 to rotate in the same direction but at a lower speed than that of the sun gear 127. This final output member has internal splines 138 for receiving a driving shaft.

There is a pump for hydraulic medium operated by the final output member. The end cap plate together with an associated plate member 140 provides a pump housing 141 with pump gears 142 and 143 operated by a gear 144 whose teeth mesh with the teeth on member 131 as shown at 145.

As stated above, we have described the torque transmitting mechanism in the housing 3 which is on the right hand side of the structure generally shown in Fig. 1, and it will be understood that an identical torque transmitting mechanism is disposed in the housing 2 on the left hand side of the structure shown in Fig. 1. Where the transmission is used in a track laying vehicle, the right hand and left hand final drive members 120 are to be connected to the driving wheels or sprockets on the right and left hand sides of the vehicle over which the tracks operate. Thus, for example, by selective engagement of the friction devices just described, the vehicle may be operated in the low ratio drive, the high ratio drive or in reverse, or the braking discs may be engaged to hold the vehicle against movement.

The power takeoff mechanism is shown in Fig. 8 and it lies in the housing portion 150 (Fig. 2) and is driven by the bevel gear 50 as previously described. As will be seen in Fig. 8, the shaft 51 with its bevel gear 50 is mounted in a bearing 152. A governor assembly is mounted in the shaft 51 and this takes the form of a combined valve housing 153 and a support for centrifugal weights. The valve housing is connected to rotate with the shaft as by means of a pin 154. There is an extension on the valve housing projecting axially of the shaft and lying concentrically with the gear 50 and mounted on this extension 154 are centrifugal weights 155. Each weight has an inwardly extending arm 156 for engaging the end of an axially shiftable pin 157. When the body portions of the weights swing outwardly on their pivots 158 the arm portions 156 urge the pin 157 to the right as Fig. 8 is viewed. This causes the pin to actuate a valve member positioned in the valve housing 153 for controlling the action of hydraulic medium. This will be described later when the hydraulic system is considered. In this way the centrifugal governor valve is mounted in a rotary torque transmitting member of the mechanism and no additional driving mechanism is needed for the centrifugal valve.

Mounted on the shaft 51 is a sun gear 160, the teeth of which mesh with those of short pinions 161. These pinions are journalled on pins 162 which are mounted in a carrier 163 which has a final drive extension 164 conveniently equipped with an attachment member 165.

The teeth of the short pinions 161 mesh with teeth of long pinions 166 (Fig. 9). The pinions 166 are likewise journalled in the carrier on pins 167. There is a brake member 168 with an external gear formation 169 with which the teeth of the long pinions mesh and another brake member 170 in the form of a ring gear with which the teeth of the long pinions mesh.

The brake member 168 has a frusto-conical flange 175 provided with facing material and positioned between the internally coned face 171 of a fixed housing member and the externally coned face 172 of a piston 173 disposed in a cylinder formation 174 in a fixed member. Shift of the piston 173 to the right causes engagement of the brake member between the coned faces 171 and 172. The brake member 170 has a frusto-conical portion 176 positioned between an internally coned face 177 of a fixed member and the externally coned face 178 of a piston 179 in a cylinder 180. Shift of the piston 179 to the left causes the frusto-conical portion 176 which is provided with facing material to be engaged between the surfaces 177 and 178.

To hold the two brake members in position, there is a coil spring 182 positioned between washers 183 and 184, one backed up by a part of the housing and one backed up by a snap ring 185. As the facings on the brake members wear in use, the position of the brake member 168, for example, will progress to the right in engaged position. In so doing it contacts and shifts the ring 183 compressing the spring 182 but when the brake is released the spring 182 shifts the brake member 168 to the left to insure disengagement with the face 171. Similarly the brake member 170 in engaged position will progress to the left as the facings wear but upon disengagement the spring 182 will cause movement of the brake member 170 to the right to insure its disengagement from the face 177. The piston 173 is held retracted by springs 187 which react against a ring 188 and piston 179 is held retracted by springs 189 which react against the washer 190. These two pistons are held against rotation by being slidably mounted on pins 192 and 193.

In normal operation, when the power takeoff is not in use, the two brake members are free as shown in Fig. 8. To drive the final power takeoff member in forward direction, the brake member 168 is engaged by movement of the piston 173. This holds the brake member against rotation. Is follows that the long pinions 166 cannot turn the brake member 168 and, therefore, the long pinions revolve around the gear 169 in the same direction as the rotation of the shaft 51 but at a lower speed. To operate the member 164 in the reverse direction, the brake member 170 is engaged and held stationary while the brake member 168 is released. The long pinions cannot now turn the brake member 170 and, therefore, revolve around the internal gear formation in a direction reverse to the rotation of shaft 51 and compels the member 164 to rotate in the reverse direction. When this transmission is employed in a track laying amphibious vehicle, the ground propelling track mechanisms on the right hand and the left hand sides of the vehicle are operated by the cross shaft 149 and the power takeoff may extend rearwardly of the vehicle to operate a propeller for moving the vehicle through water.

In a mechanism of this type, where it is desired to have the assembly of light weight construction, many of the parts are made of aluminum or similar light weight metal. Such is the case where the transmission herein described is to be used with an airborne track laying military vehicle. This involves a difficulty with certain of the friction parts. For example, the fixed part 101 (Figs. 6 and 13) and the piston 102 are preferably constructed of aluminum where lightness in weight is desired, and yet these parts are provided with cone faces. Similarly, the fixed parts of the cone brakes, as shown in Fig. 8, are preferably aluminum. The cone member 100 and the cone members 175 and 176 are preferably steel because these parts have gear formations thereon. The difficulty encountered is that of providing a friction surface on the aluminum parts capable of standing up under usage. To this end, the aluminum faces are given a coating of metal which is preferably stainless steel. This is indicated in Fig. 13 where the clutch member 100 and associated parts is shown. The cone member 100 has friction facing material 100a on opposite faces thereof while the aluminum member 101 has a metal facing, such as stainless steel, such as 101a thereon. Similarly, the cone face of the piston 102 has a metal coating facing 102a.

The metal facing constitutes a coating for frictionally engaging the facings on the cone member and this metal is preferably sprayed onto the cone faces. While the metal coating may be applied to any one of the clutch members, it is preferable to apply the same to those having considerable mass, such as the member 101 and the piston 102 for heat dissipation purposes. The facings on the member 101 act to some extent as a heat insulator but the metal facings do not so function, and, as a result, heat is rapidly dissipated into the more massive elements, and particularly the housing element. Fig. 13 represents the one cone brake but the same construction is embodied in the two coned brakes shown in Fig. 8.

Furthermore, where the various parts, including the housing elements and pistons are of aluminum, aluminum alloys or similar metal, means must be employed to maintain an efficient seal for the hydraulic medium due to the fact that the coefficient of expansion is high. Accordingly, a piston ring assembly is used in necessary locations in each cylinder and piston combination. One piston ring is shown in Fig. 14 at 200. This piston ring is advantageously of cold rolled steel stock. The ends of the piston ring are each of reduced width as shown in Fig. 14, and are lapped over each other as indicated at 201. The crack or kerf between the lapped ends extends axially through the ring; in other words, one end of the ring has a relatively narrow end portion which underlies the outer overlying portion of the other end. Several of these rings are placed in a ring groove in a piston or in a wall of the cylinder receiving the piston and an undulated expansion ring 202 is placed under the rings.

In Fig. 16, there will be seen an enlarged view illustrating four of the rings with the underlying expansion ring 202. This ring assembly is generally illustrated at 203 and this reference character is used to indicate such ring assemblies where used in the cylinder and piston structures. In Fig. 8, for example, one assembly is in a groove in the piston and the other assembly is in the inner cylinder wall to engage the piston. It will be understood, of course, that the cylinder and piston are annular affairs. Similar arrangements are shown for the cylinders and pistons in Fig. 8. When there is expansion due to heat, the plurality of rings of each assembly expand to maintain frictional engagement with the cooperating wall of the piston or cylinder, as the case may be, and the overlapping parts at 201 shift relative to each other. The joints 201 of the rings of an assembly are usually spaced from each other circumferentially in a random manner and thus a tortuous passageway is provided through which leaking oil must pass. This arrangement has been found to provide a very good seal for the hydraulic controlling piston elements.

As pointed out above, the brakes for the final drive members are not only hydraulically operated but are manually operated and to this end, as shown in Fig. 1, there are two brake levers 205 and 206. These may be connected with suitable means, such as a brake pedal so that the operator thereof may apply the brakes.

As shown in Figs. 6 and 11, where the right hand brake assembly is illustrated, there is a supporting ring 207 bolted to a housing member and mounted thereon is an oscillating ring 208. These two rings are inter-associated by an anti-friction camming arrangement, shown in Fig. 12 as being in the form of an angularly disposed groove 209 in the supporting ring and a cooperating groove 210 in the oscillating ring and a series of balls 211 are disposed in the two mating grooves. There are several groups of ball sets 211 spaced circumferentially about the members 207 and 208. The oscillating ring 208 is provided with a recess 213 for receiving a strut 214. One end of the strut is positioned in the recess 213 and the other end is positioned in a recess 215 in the lever 206.

Associated with the oscillating ring 208 is a ring 217 which engages the pins 119 (Fig. 6). The ring 217 is freely rotatable relative to the oscillating ring 208 as by means of ball bearings 218 and the ring 217 is held in position by a washer 219. Now when the lever 206 is oscillated by a foot pedal or the like in a counter-clockwise direction, as Fig. 11 is viewed, the strut causes a clockwise movement of the oscillating ring 208. Due to the camming action of the several series of balls 211 in their angularly disposed grooves, the oscillating ring 208 is shifted to the left, as Fig. 6 is viewed. This causes the pins 119 to shift the piston 117 to the left to thus engage the several discs of the braking clutch. Since the two levers 205 and 206 are to be connected together for operation in unison, both braking clutches are applied simultaneously. The application of the brakes, of course, serves to decelerate the final drive member and the carrier 73 in the event the vehicle is moving and serve to lock and hold the final driving member at rest when the vehicle is standing.

In considering the hydraulic system for the control of the transmission, it appears feasible to also cover certain mechanical parts in the hydraulic system and to deal with the operation of the structure. Therefore, in describing the hydraulic system, the operation of the transmission will be discussed as well as certain mechanical and structural features of elements involved.

Figure 17:
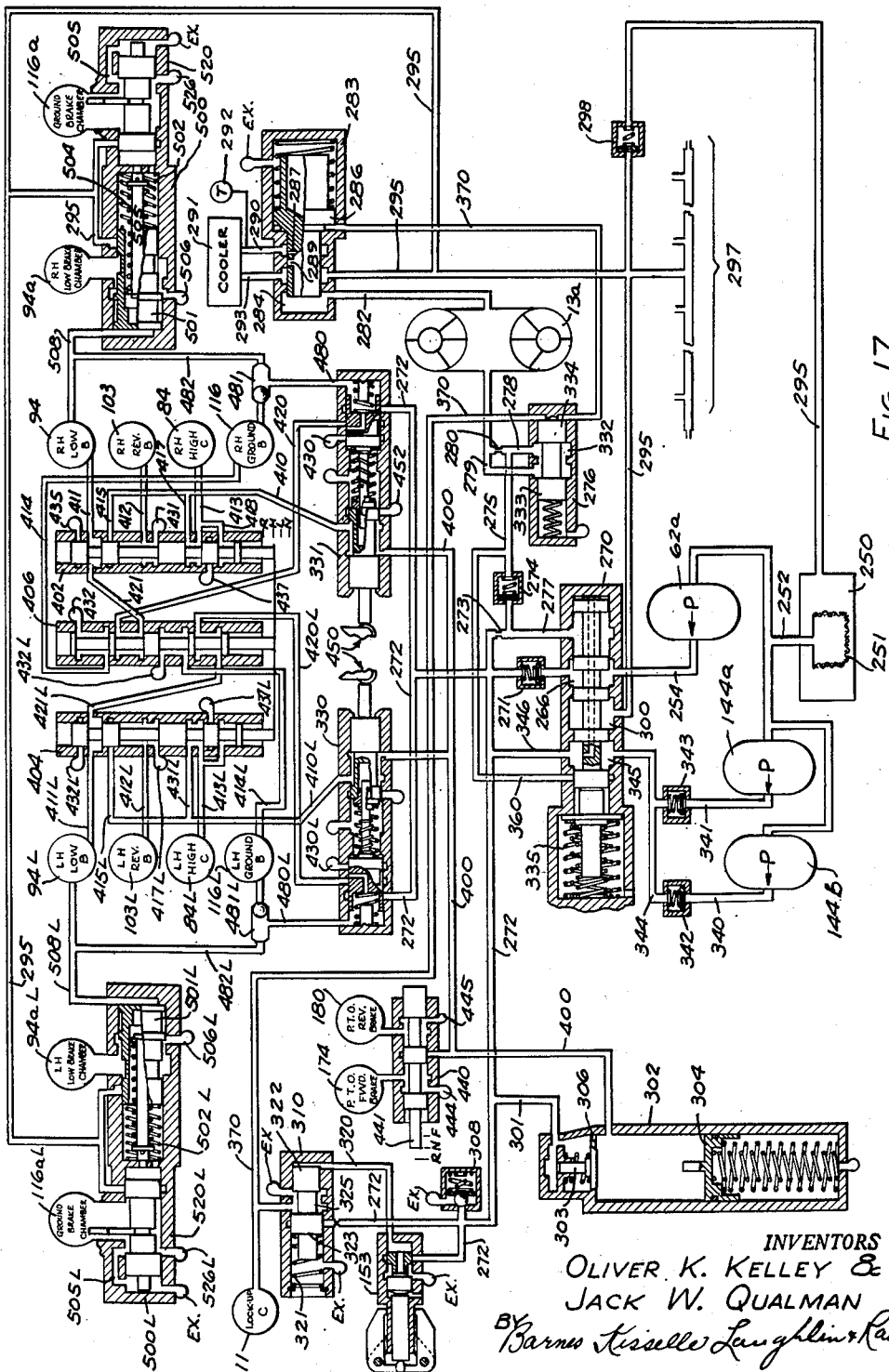
Fig. 17 is a diagrammatic view illustrating the hydraulic control system and showing the condition of the system with the engine idling, no torque being transmitted, and the transmission set for transmitting torque in high speed ratio.

The hydraulic system is illustrated completely, but diagrammatically in Fig. 17. Structural features of some of the elements, and the position of some of the elements are shown in other views. The sump in the transmission housing is illustrated at 250, and in the sump is a suitable filter 251 through which the oil passes as it flows into the pump inlet line 252. The pump 62a is the one operated by the engine through the means of the gear 62 (Fig. 4) and the outlet of this pump is at 254. The two pumps which are operated by the torque output members are illustrated at 144a and 144b both connected to the inlet line as shown. The right hand pump 144a is operated by the gear 144 (Fig. 6) and it will be understood that the pump 144b is located at the opposite output member.

Fig. 17 shows the system in a condition with the engine idling and with the transmission in high range with the vehicle standing still. Therefore, pump 62a is operating but pumps 144a and 144b are not operating. At this time, oil is being pumped through the passage 266 of a main line pressure regulator valve 270 through check valve 271 into a main line 272. The oil is conveyed to and through the torque converter generally indicated at 13a, the same passing through an orifice 273, check valve 274, line 275 and through the converter orifice valve 276. The main line has a branch 277 which connects to the main line pressure regulator valve and a branch 278 leading to the converter orifice valve 276 while a line 279 leads to the converter. The main line is also connected to the line 279 through an orifice 280.

The oil passes through the converter and into a line 282 to a converter regulator valve 283 and specifically into the chamber 284 thereof. In the converter regulator valve is a spring pressed valve member 286, the spring acting against the pressure in chamber 284. The valve member has two portions of different size as shown and the small part has two ports, a small one 287 and a larger one 289. The oil entering chamber 284 passes through line 290 to an oil cooler 291 and the temperature of the oil may be indicated by an instrument indicated at 292. From the cooler the oil flows through line 293 back through the converter regulator valve and into lubrication line 295. Various outlets in the lubrication line are indicated generally at 297, these outlets furnishing oil to parts to be lubricated.

In the lubrication line 295 is a pressure regulator valve 298 from which a portion of the lubrication line extends back to the sump. All parts of the lubrication line or conduit are identified by the same reference character 295. The lubrication line 295 also extends to and connects into chamber 300 of the main line pressure regulator valve.

The main line also extends, through a connecting line 301, to an accumulator 302 provided with spring seated valve 303 and a spring actuated plunger or piston 304, there being an orifice 306 by-passing the valve 303. The main line 272 also extends to a main line safety valve 308 and to a governor valve 153. The main line pressure also extends to a lock up clutch valve 310.

The governor as shown in Fig. 26, has a valve member 311 therein with a groove 312 and a land 313. The valve member has a passage 314 therein which connects groove 312 to the end cavity 315 of the valve body 153 and leading therefrom is a line 320 which extends into the end of the lock up clutch valve 310. The governor maintains a pressure in conduit 320 which is a function of the speed of rotation of the torque converter output shaft 27.

The lock up clutch valve has a valve member therein acted upon by a spring 321 and it has a land 322 and a land 323 which define a groove 325. In the position shown in Fig. 17 the main line 272 is closed by the land 323. The land 323 is of a larger diameter than the land 322 for purposes which will presently appear.

The main line 272 also connects into two steering valves 330 and 331. These valves are identical and in order to simplify disclosure thereof, only one will be described. Suffice it to say at present, that when the system is in the condition shown in Fig. 17 the line 272, where it enters the steering valve 331 is closed by the valve member therein as shown in Fig. 27. The same thing is true of the left hand steering valve 330.

The system in the condition thus described is ready for transmission of torque. Assume that the engine is operating at idling speed and that the torque converter is placing only a slight drag thereon and is not transmitting sufficient torque to move the vehicle. The engine operated pump is supplying a flow of oil through the converter and it is to be observed that the converter orifice valve 276 is wide open. The converter orifice valve has a spring pressed valve member therein which has a groove 332 between two lands 333 and 334. Thus, there is a full flow of oil through the converter. Relatively high operating pressure is maintained in the converter. The pressure in the main line is determined by the valve 270, and valve 308 is a safety valve to limit the maximum pressure in the main line, and pressure is supplied to the governor valve, the lock up clutch valve, the accumulator, and to the steering valves.

Without, at this time, considering the operation of the manual control valves, in order to put the vehicle into operation, it is believed expedient to describe what happens when the system begins to transmit torque from the idling condition just described. As soon as the vehicle starts to move, upon acceleration of the engine, or, in other words, as soon as the power output members 120 (Fig. 6) start to turn, the two pumps 144a and 144b go into operation, and oil is pumped through their outlet lines 340 and 341 through check valves 342 and 343 into a line 344 and into the main line pressure regulator valve. Oil passes into and through port 345 and through line 346 to the main line 272.

The main line pressure regulator valve has a valve stem with a plurality of lands indicated at 350, 351, 352, 353 and 354, defining grooves therebetween (Fig. 18) and this valve member is spring loaded and held normally in its right hand position, a stack of springs being illustrated at 355. The valve member has a passage 357 which opens between the lands 353 and 354 and extends through the valve member and opens into the regulating chamber 358. At this time, namely, at the beginning of the operation of the vehicle, all pumps are pumping into the main line and the pressure from the output pumps 144a and 144b is transmitted to the regulating chamber 358. As the pressure from the output pumps rises the main line pressure regulator valve stem is shifted to the left as Figs. 17 and 18 are viewed.

Several things occur in sequence as determined by the relative position of the lands of the valve members and the cooperating ports.

First, the land 351 opens the connection between line 254 of the engine driven pump and line 277 so that the engine driven pump pumps oil more rapidly to the converter by-passing the choke 273.

Second, the valve land 354 opens the connection between the pressure line 344 of the output pumps and a line 360 which connects into line 275, thus by-passing the choke 273 for the pumping of oil to the converter. At this point, it is to be remembered that torque is being transmitted and this torque is transmitted from the engine through the torque converter (Fig. 4) and through the shaft 27. Therefore, the torque converter is functioning and there is a relatively high rate of flow of oil therethrough because the converter orifice valve 276 is wide open and oil passes freely from line 278 into line 279. Also, the requisite high pressure is maintained in the torque converter by reason of the position of the converter regulator valve 283 which position is that as shown in Fig. 17.

Third, the valve land 352 shifts to the left and establishes a connection between the high pressure line 254 of the engine driven pump 62a and the relatively low pressure lubrication line 295. This reduces the pressure of front pump 62a so that the output pumps 144a and 144b supply the principal quantity of oil to the system, whereas the output of the engine driven pump now flows principally into the lubrication system. The pressure regulator valve 298 in the lubrication system is set to maintain a relatively low pressure in the lubricating system, say about 25 pounds per square inch, whereas, the pressure in the main line 272 is maintained relatively high, as, for example, about 140 pounds per square inch. Under these conditions, the check valves 271 and 274 will close.

Fourth, the valve land 353 will, when the pressure in the chamber 345 gets sufficiently high, open the connection from the pressure line 344 of the output pumps to the lubrication line 295. This serves as a pressure regulator for the main line and upon a drop of pressure in the line 344, the land 353 will throttle or close the connection to the lubrication line.

In Fig. 18, the valve member of the main line pressure regulator valve is shown in the position of operation where all ports, as above described, are open except that the valve land 353 is closing the connection between the pressure line 344 and the low pressure lubrication line 295. It must be remembered also that the accumulator chamber 302 fills with oil thus displacing the piston 304 against its springs as shown.

The torque converter employed is conveniently and preferably one which has a high torque conversion ratio and it is desirable, in the interest of economy, to lock out the torque converter during normal operation. As operation continues, and the speed of the vehicle increases, the speed of operation of the output pumps 144a and 144b increases, with the result that the pressure of the oil pumped thereby increases up to the maximum permitted by the regulator valve 270. Moreover, as the speed of the vehicle increases the centrifugal weights 155 of the governor swing outwardly and urge the valve member of the governor valve to the right as Fig. 26 is viewed. The valve land 313 cracks the port 316 and the increasing main line pressure enters into the groove 312 and is transmitted into the governing end chamber 315. Thus, the pressure in the chamber 315 and in line 320 is governed by the speed of the vehicle. As the speed increases the port 316 is opened more and the pressure in line 320 increases. When the pressure transmitted to the valve 310 is sufficiently high to overcome spring 321 the lock up clutch valve stem is shifted to the left as Fig. 17 is viewed and the valve land 323 opens the main pressure line 272 so that oil passes through the groove 325 and into the lock up clutch line 370. This line extends to the lock up clutch cylinder 11. Specifically, this portion of the line 370 is in the shaft 27 (Fig. 4) and the pressure in the cylinder engages the lock up clutch as previously described so that torque is transmitted directly through the clutch and not through the torque converter.

The line 370 (Fig. 17) also controls the converter orifice valve 276. When the lock-up clutch is engaged shifts the valve stem 333 to the left as Fig. 17 is viewed, and the land 334 closes the line 278 so that oil cannot be pumped to the converter except through the orifice 280. The lock up clutch pressure line 370 continues on to the converter regulator valve 283, where it enters the body thereof at the left of the large land 286. This pressure shifts the converter pressure regulator valve member to the right. This establishes a connection of the large port 289 with the cooler inlet line 290. The result of this is that when the lock-up clutch is engaged, the flow of oil through the converter is reduced and the pressure in the converter is reduced inasmuch as the converter is not now being used to transmit torque. At this time the outlet for the converter discharges through the cooler into the lubrication system, through line 293 into line 295, wherein the low pressure is maintained by the pressure regulator valve 298.

Of course, if the vehicle decelerates, the lock up clutch will become disengaged and the converter will again be employed to transmit the torque. It is desirable to have the lock up clutch engage upon acceleration at a higher speed than that at which it disengages upon deceleration. In a track laying vehicle of the type above referred to, the lock up clutch may engage at about 18 miles per hour, in high gear drive, whereas it may disengage at about 14 miles per hour. These figures are only an example. This is accomplished by reason of the fact that the land 323 of the lock up clutch valve is larger than the land 322. It follows that the lock up clutch becomes engaged incident to the pressure introduced through the line 320. Once the lock up clutch valve is shifted to the left, and the main line pressure is introduced into the groove 325 between the two lands, there is an added force holding the valve stem to the left as Fig. 17 is viewed. Therefore, the lock up clutch valve will not shift back to the right until the governor pressure has lowered somewhat and this lowering of the governor pressure is determined by the speed of the vehicle. When the vehicle reaches about 14 miles per hour, for example, the lock up clutch valve member will shift back to the position shown in Fig. 17. This action also opens the lock up clutch cylinder to the exhaust shown on the lock up clutch valve. The oil under pressure in the lock up clutch cylinder is thus exhausted and the lock up clutch disengages. At the same time, the loss of pressure in the line 370 permits the valve member of the converter orifice valve 276 to shift back to the position shown in Fig. 17 for a full supply of oil to the converter and also at the same time, failure of pressure in the line 370 permits the valve member of the converter pressure regulator valve 283 to shift back to the position shown in Fig. 17, to thus maintain the requisite high pressure in the torque converter for its operation.

A pressure line 400 leads from the accumulator to other controlling elements. This line 400 leads both to the left hand and right hand steering valves 330 and 331. These steering valves are hydraulically associated with manually controlled valves by means of which the operator determines whether the transmission is conditioned in neutral, low, high or reverse. There is a right hand control valve 402, a left hand control valve 404 and an auxiliary valve 406. These valves are operated in unison by the operator and are capable of being positioned in the several positions indicated.

In describing the function of these valves, the right hand control will be taken up in detail, it being understood that the left hand control is identical but opposite. A line 410 extends from the right hand steering valve 331 and connects into the valve 402 in two locations 415 and 417. This valve 402 is connected by a line 411 to the right hand low brake cylinder 94; it is also connected by a line 412 to the right hand reverse brake cylinder 103; it is also connected by a line 413 to the right hand high clutch cylinder 84. The auxiliary valve 406 is connected by a line 414 to the right hand ground brake cylinder 116. Similarly, the left hand steering valve 330 is connected to the left hand control valve by a line 410L, which connects into the control valve at two locations as shown, and also, similarly, the valve 404 is connected to the left hand low brake cylinder, the reverse cylinder and the high cylinder by lines 411L, 412L, and 413L. Also the auxiliary valve is connected by a line 414L to the left hand ground brake 116L.

There is a line 420 which connects the right hand steering valve to the auxiliary valve and a similar line 420L which connects the left hand steering valve with the auxiliary valve, and the auxiliary valve is connected to the control valve 402 by a line 421 and is connected to control valve 404 by a similar line 421L. The three control valves 402, 406 and 404, are shown in the high speed range operating condition in Fig. 17.

These three valves are conveniently located in a position on the housing as illustrated in Fig. 10 in a common casing and may be operable by cross head 422 in turn actuated by a lever 423 located on the outside of the housing (Fig. 1). In the position shown in Fig. 17 oil under pressure is transmitted from the accumulator chamber through line 400 through the right hand steering valve 331 into line 410. The oil is transmitted through line 417 and through the valve 402, through line 413 to the right hand high clutch cylinder 84. In a similar manner oil is transmitted to the left hand high clutch cylinder. Therefore, the right and left hand clutches are engaged and thus, for example, the two sun gears 70 and 76 are locked together for direct drive between the shaft 49 and the carrier member 78.

At this time, it will be noted that the right hand low brake cylinder 94 is exhausted or vented through line 411, valve 402, line 421, through valve 406, line 420, and to the right hand steering valve exhaust 430. The right hand reverse brake cylinder is vented through the line 412 and valve 402 and exhaust 431. The right hand ground brake is vented through line 414, valve 406 and exhaust 432. In a similar manner, the left hand low brake, reverse brake and ground brake are vented.

The manual control valves are shown adjusted to the low speed ratio drive in Fig. 19. In this figure, the cylinders for the right hand brakes are shown only. Oil under pressure from the line 400 passes through the right hand steering valve 331 and into the valve 402 through the line 415, through this valve and through line 411 to the right hand low brake cylinder 94. The left hand low brake is similarly supplied with oil under pressure and it follows that the disc brake 90—91 is engaged and the sun gear 76 is held stationary so that the member 78 revolves in the same direction as the shaft 49 but at a lower speed. At this time the right hand reverse brake cylinder is vented through line 412 to exhaust 431; the right hand high clutch is vented through line 413 to exhaust 437; right hand ground brake 116 is vented through line 414 through valve 406 line 420 to exhaust 430.

When these valves are shifted to the neutral position, as shown in Fig. 20, the pressure inlet connections 415 and 417 are closed at the valve 402. The right hand low brake is vented through line 411 valve 402 to exhaust 435. The right hand reverse brake is vented through its line 412 to exhaust 431. The right hand high clutch is vented through line 413, branch line 418 to exhaust 437. The right hand ground brake is vented through its line 414, through valve 406 to line 420 and exhaust 430. Thus, all friction devices are disengaged and the drive shaft 49 rotates freely with the gears of the planetary gear sets idling with no motion transmitted to the hub member 78 of the carrier.

When the valves are positioned for reverse drive as shown in Fig. 21, oil under pressure from line 410 enters valve 402 through line 415 through the valve and into the right hand reverse cylinder 103 through line 412. At this time the right hand low brake is vented at exhaust 435; the right hand high clutch is vented through its auxiliary line 418 to exhaust 437, and the right hand ground brake is vented through its line 414 through valve 402, line 420 to the exhaust 430 on the right hand steering valve. The relationship between the left hand manual control valve 404 and the auxiliary valve 406 is the same as the relationship between the right hand manual control valve 402 and the auxiliary valve 406, with the result that both right and left hand reverse brakes are engaged. Thus, the cone member 100 is engaged and the internal ring 77 held immovable so that the carrier and its hub 77 turn in a direction opposite the direction of rotation of the shaft 49.

The hydraulic system which includes the cylinders for operating the brake and clutch pistons is, as above noted, serviced from the accumulator. Normally the accumulator has a quantity of oil therein serving as a reservoir, and when a cylinder is to be filled with oil, the accumulator supplies a large portion of the oil, and thus there is no substantial drop in the pressure in the main line. If the accumulator is exhausted of all oil, its piston will raise and unseat the valve 303. The action of the acmulator cushions clutch or brake engagement. When a valve opens the system to a cylinder there is a cavity to be filled and the piston 304 shifts upwardly under spring load, as Fig. 17 is viewed, to thus supply much of the demand. As the springs expand their force lowers and when at about the top of its stroke the pressure in accumulator 302 and line 400 is relatively low. This effects a cushioned or somewhat delayed clutch or brake engagement. Some oil however is supplied through port 306. When the piston 304 unseats valve 303 oil flows through the wide opening of the valve and the pressure in the accumulator raises. This increase in pressure overcomes the springs acting upon the piston 304 and it again is urged downwardly in the accumulator. For example, when the piston 304 is in its low position in the accumulator with the springs compressed, the pressure in the accumulator may be about 90 pounds per square inch, and when it is at the top of the accumulator in a position to open valve 303 the pressure in the accumulator may be about 20 pounds per square inch.

The power takeoff valve is illustrated at 440 and it has a valve member with three lands and two grooves therein shiftable to three positions, namely, reverse, neutral and forward, as shown by the letters R, N, and F, on Fig. 17. This valve member may be situated on the transmission as indicated at 440 (Fig. 10) and the valve member 441, may be operated by a lever 442 positioned on the outside of the case. Of course, suitable operating means will extend to a convenient location for manipulation by the operator. As shown in Fig. 17, the power takeoff valve is in neutral and the center land of the valve member closes the line 400. If the valve member is moved to the right, it is in forward position, and oil is delivered through the valve to the cylinder 174. At this time, the exhaust 444 is closed. This engages the cone clutch member 175 and thus the sun gear 169 is held against rotation. The long pinions 166 thus revolve around the sun gear 169 and compel the carrier to turn in the same direction but at a lower speed than that of the shaft 51 as above described.

When the valve member 151 is shifted to the reverse position, the forward brake cylinder 174 is vented to the exhaust 444 and the reverse clutch cylinder 180 is supplied with oil through the valve 440 and the exhaust 445 is closed. Now the ring gear 170 is held stationary and the pinions revolve around the same reverse to that of the shaft 51 compelling the carrier which is the final drive member to turn in reverse direction. When the valve member is in neutral position, both forward and reverse cylinders are vented as shown in Fig. 17.

It will be noted that some of the hydraulic lines associated with the three manual control valves are connected into or through the two steering valves 330 and 331. This is for the purpose of steering the vehicle by manipulation of a selected friction device. The right and left hand steering valve members 330 and 331 may be located in a single housing on a transmission case as shown in Fig. 10 and their valve members are operable by a suitable steering apparatus which may be in the form of a steering wheel or handle bars (not shown). For this purpose, there is a rocker arm 450 mounted on a shaft and which has an actuating arm 451 on the outside of the case arranged to be suitably connected with the manually operated steering element. For convenience, the element 450 is shown divided in Fig. 17 because the valves are positioned opposite each other.

The right and left hand steering valves are identical, and the structure of the right hand valve 331 is shown in Figs. 27 and 28. The lines 272, 400, 410 and 420, connect to the valve, as previously described, it has the exhaust 430 and an exhaust 452 and an exhaust 453. Within the casing is a composite valve, one stem of which 460 is to be actuated by the element 450 and it has two lands with an intervening groove 461. A second valve stem 463 is acted upon by a coil spring 464 mounted in the end chamber 465. The stem 463 has two slots cut therethrough as at 466, which two slots constitute a groove for connecting an annular port 467 in the body to which the line 420 connects either to exhaust at 430 or to the main line at 272. The stem 463 has a passage 470 opening into the end chamber 465. A pin 471 slidably enters recess 472 in valve member 460. This pin is surrounded by a spring abutment 473 seating against the member 460 and a coil spring 474 holds the two valve members separated. A second coil spring 475 is positioned within spring 474 but it normally is out of contact with the member 460. The normal position of the valve member is as shown in Fig. 27.

In addition to the hydraulic connections previously described for the steering valves, the right hand steering valve 331 has a line 480 which connects through a double check valve 481 to the right hand low brake cylinder, through line 482, or to the right ground brake. The left hand steering valve has similar hydraulic connecting lines which are provided with the same reference characters with the addition of the letter L.

Figure 23:
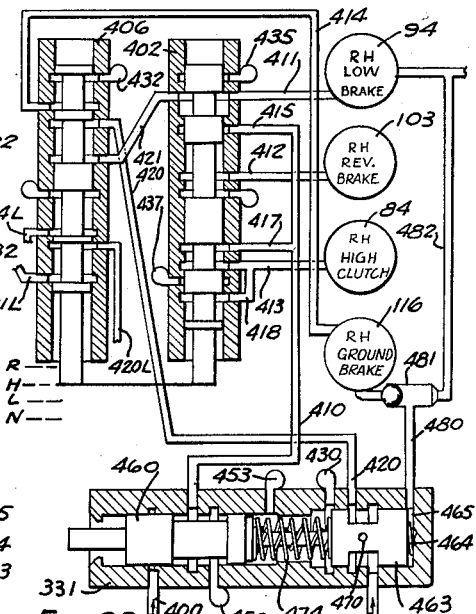
Fig. 23 is a view similar to Fig. 22 showing how the hydraulic mechanism functions in steering the vehicle when the transmission is set for transmitting torque in the high speed ratio.

With the transmission set for high speed ratio operation, as shown in Fig. 17, both right and left hand high clutches are engaged and oil under pressure, for example, is being delivered to the right hand clutch piston cylinder 84. Now when the driver of the vehicle makes a turn to the right the element 450 shifts the valve member 460 to the right against the action of the back up spring 464. The movement of the valve member 460 closes the accumulator pressure line 400 where it enters the valve 331 and opens the line 410 to the exhaust 452 (Fig. 23). Therefore, the right hand high clutch chamber 84 is vented or exhausted through the line 413, valve 402, line 417, and line 410, and exhaust 452 so that the high clutch disengages.

Also, movement of the valve member 460 causes movement of valve member 463 through the interposed spring 474. This closes the exhaust 430 for the low brake cylinder 94 and connects the high pressure line 272 to the line 420 so that pressure is transmitted through line 420, auxiliary valve 406, line 421, through right hand manual valve 402 and into the low brake cylinder. Thus, while the vehicle is operating, the left hand track remains in the high speed ratio and the right hand track is dropped to the low speed ratio and the vehicle is thus turned to the right.

The oil under pressure which is delivered to the low brake cylinder 94 continues on through that cylinder and into line 482 (Figs. 17 and 23). This oil is fed back through the two way check valve 481 and line 480 into the end chamber 465 to thus aid the back up spring 464. The pressure causes the check valve to close the connection from the right hand ground brake cylinder 116. This feed back of oil into the chamber 465 may cause a fluttering or oscillation of the valve member 463. To prevent this and to stabilize the action of the valve member 463, oil from the high pressure line 272 (Fig. 27) feeds into the port 470 as the valve member 463 is shifted to the right and port 470 is in communication with annular port 467. Port 470 leads into the chamber 465 so that some of the high pressure oil tends to flow toward the low brake cylinder 94 through the lines 480 and 482 in this position of valve member 463. This feed back arrangement gives a nicety of action.

In steering the vehicle in this manner, the operator is given a proper "feel" of the situation. The initial turning of the steering wheel may be accomplished with little effort with some compression of the spring 474. As the steering wheel is turned further, the spring 475 comes into play which requires more effort for a shorter turn and finally the extension 471 will bottom in the recess 472.

Figure 24:
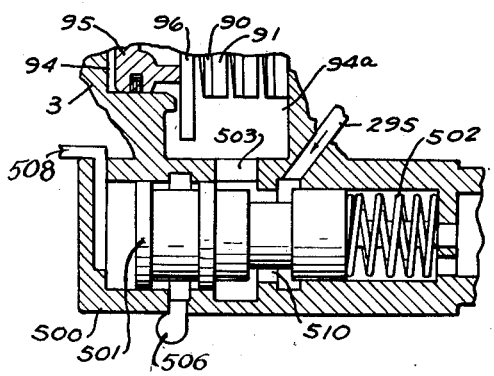
Fig. 24 is a detailed view largely in section showing the valve for controlling the flow of lubricant to the low speed ratio clutch.

In making a turn in the above described manner in a fairly large radius, the low brake discs 90 and 91 are caused to slip because they are not fully engaged. This, of course, depends upon the position of the valve member 463 as it meters and controls the connection between the high pressure line 272 and the line 420. At this time it is desirable to lubricate the discs and this is accomplished through the means of the lubrication valve 500 (Fig. 17). This valve is positioned in the casing as shown in Fig. 24 adjacent the chamber 94a for the discs. The lubrication line 295 connects into the valve body 500 and the chamber 94 connects into the same through port 503. This valve has a valve member 501 therein backed up by a spring 502, there being also a preloaded spring 504 mounted on a rod 505 which extends into the valve member 501 and adapted to be engaged by the valve member 501 as will presently appear.

In the normal free position, the valve member 501 is positioned to the left as shown in Fig. 17. At this time the chamber 94a is vented through the valve member and to the exhaust 506. When oil under pressure is delivered to the cylinder 94 the oil flows through line 508 into the end of the valve 500 and shifts the valve member 501 to the right thus closing the exhaust 506. A port 510 in the valve member registers with the lube line 295 and with the port 503 as shown in Fig. 24. Under this condition, the right hand steering valve is acting as a pressure regulator so that the pressure in the chamber 94 is not full pressure and the low brake is slipping. The valve 501 has compressed spring 502 and is now seated upon the preloaded spring 504. Therefore, all the while the low gear brake discs are slipping for steering purposes, lubricant is entering the chamber 94a. And it might be stated that the radius of turning can be governed by the operator depending upon how much turning effort is placed on the right hand turning valve member. To completely engage the low brake, the operator may swing the steering element to the limit of its movement thus widely opening the connection from the main pressure line 272 to the line 420 (Fig. 27). This full line pressure passes to the valve 500 and pushes the valve member 501 to the right further than that shown in Fig. 24, and thus closes the connection between the lubrication line 295 and the chamber 94. Thus when the right hand low brake is fully packed, the right hand power output member operates at the definite low speed ratio and the vehicle will turn on a fixed radius and there is no lubrication of the low gear brake discs at this time. It is also to be pointed out that when the vehicle is operated in the low range, that the low brakes are fully engaged and full line pressure is delivered to both the right hand and left hand lubrication valves and lubrication is cut off from the discs.

When steering to the left, the same thing occurs relative to the left hand steering valve 330 and the left hand lubrication valve 500L. This valve is identical to the right hand lube valve and the parts thereof have the same reference characters applied thereto with the addition of the letter L.

Figure 22:
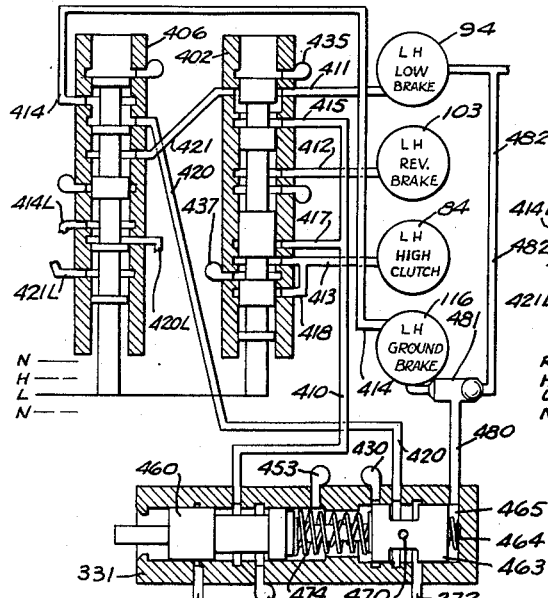
Fig. 22 is a diagrammatic view showing how the valve mechanism functions in the steering of a vehicle when the transmission is operating in the low speed ratio condition.

When the vehicle is operated in the low range the right and left low brakes are, of course, applied and torque is being transmitted thereto. When the steering apparatus is manipulated the right or left hand steering valve is again actuated by the element 450 and this time the ground brake discs 110 and 112 are engaged depending upon the direction of turning. During operation in low gear, as previously described, and as shown in the setting in Fig. 19, oil under pressure is supplied from line 400 through the right hand steering valve, line 410 through the valve 402 and to the right hand low clutch chamber 94. The left low brake cylinder is similarly supplied with oil under pressure. The right hand ground brake is vented through line 414, auxiliary valve 406, line 420, ports 466 of the right hand steering valve and exhaust 430. The left hand ground brake is similarly vented. Upon movement of the right hand steering valve to the right, as shown in Fig. 22, the pressure to the right hand low brake chamber 94 is cut off and it is vented through the exhaust 452. The valve member 463 establishes a connection from the main pressure line 272 into line 420, through auxiliary valve 406, and into line 414 and to the ground brake cylinder 116 so that this brake begins to engage. The oil from the ground brake cylinder is conducted to and through the double check valve 481 which now closes the line 482 and then the pressure is conducted through line 480 to the chamber 465 in the end of the right hand steering valve to aid the back up spring 464. To cushion the shock on the right hand steering valve and to keep it from fluttering, some of the high pressure liquid is bled off through the port 470 in the valve member 463 and into the chamber 465 in the manner as above described. The degree of engagement of the ground brake is regulated or controlled by the amount of turning effort applied by the operator and, therefore, the extent of movement of the steering valve members.

Figure 25:
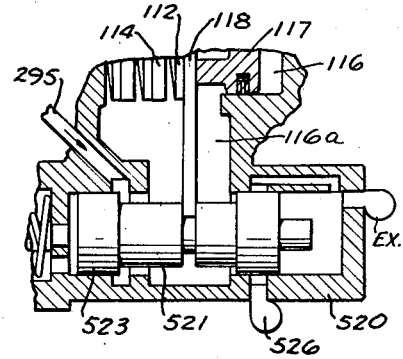
Fig. 25 is a view illustrating the valving for controlling the flow of lubricant to the ground brake.

While the ground brake discs are slipping it is desirable to lubricate them and this is done through the means of the right hand lubricating valve 520 (Figs. 17 and 25). This valve is mechanically actuated by the brake plate 118 which has a direct connection with the valve member 521. The lubrication line 295 connects into the valve member 520 as indicated and it is normally closed by head 523 of the valve member. When the plate 118 shifts to the left the lubrication line 295 is opened through the valve member into the disc chamber 116a. When the valve member 521 is in brake disengaged position, the chamber 116a is vented through exhaust 526. Thus while operating in the low range and a turn is to be made to the right, the ground brake is applied to an extent determined by the position and action of the right hand steering valve. If a slight turn is desired the ground brake discs slip on each other in which action they are lubricated. If the ground brake is completely engaged so that there is no slippage the right hand power output member 78 is held fixed and, therefore, the right hand track is held stationary and the vehicle will turn upon a relatively short radius. For turning to the left there is a left hand lubricating valve 520L with parts identical to those in the right hand steering valve and which have the same characters applied thereto with the addition of the letter L.

Many of the conduits, that is, oil conducting lines are embodied in the mechanism in the form of passageways in operating parts and in housing parts. For example, in Fig. 4 it will be seen that the line 370 leading to the lock out clutch is partly in the form of an axial passage in shaft 27. Also the lubrication line 295 will be noted as in the form of a passage in the shaft 49 (Fig. 6). It is deemed unnecessary to show all these passages in the mechanical drawings, it being sufficient that they are indicated completely in the diagrammatical view in Fig. 17. Furthermore, the various valves are advantageously grouped in close proximity to each other some of which are indicated in Fig. 10.

The operation of the transmission and its hydraulic control has been covered in the course of the detailed description. However, it is thought expedient to give a rather brief and overall description of the operation. When the engine is idling no substantial torque is transmitted because of slippage in the torque converter. Upon acceleration of the engine, the torque is transmitted through the torque converter. Considering that the vehicle is of the track laying type, as above described, the torque converter is cut out at about 18 miles per hour, for example, and the torque is then transmitted directly through a clutch. If the vehicle is being operated in low gear, however, the torque converter is cut out at a lower vehicle speed. Upon deceleration of the vehicle, while it is being propelled by the engine, the clutch does not disengage to restore the torque converter until the vehicle has reached, for example, about 14 miles per hour. Of course, the speeds at which the lock up clutch engages and disengages are exemplary only and this may vary in different vehicles, in accordance with the type of operation desired and things to be accomplished.

The operator by a conventional type of controlling member may shift the three manually operated control valves to condition the transmission for operation in a high gear, low gear, reverse and neutral. In high gear, right and left hand clutches are engaged to control elements of the planetary gear systems; in low gear brake elements are engaged to control other elements of the planetary gear systems; in reverse, brakes are engaged to control still other elements of the planetary gear systems; in neutral all clutches and brakes which affect the planetary gear systems are disengaged. Needless to say, when friction devices are engaged for effecting one condition for the transmission of torque the friction devices for controlling the other conditions are disengaged.

The steering is accomplished by controlling the power output members. When the vehicle is being operated in high gear, either the right or the left power output member may be dropped into the low gear condition depending upon whether a turn is to be made to the left or right. This is accomplished by the energizing of a low brake and the operator has control of the situation in that he may cause slippage of the brake to thus control the angle of turn. During such slippage of the brake which is energized for such purpose, it is lubricated to minimize wear.

A similar situation exists when the vehicle is being driven in low gear and it is desired to make a turn either to the left or to the right. In this case, the low gear drive for one power output member is disestablished and a brake is applied which serves to decelerate either the right or left power output member to effect a turn to the left or right. Here again the operator has control of the situation and may cause slippage of the brake to determine the angle of turn. Also, the brake elements are lubricated while slipping to minimize wear. Thus the steering is accomplished by the manipulation of hydraulic steering valves and there are no mechanical connections between the manually controlled steering device and the driving mechanism.

The power takeoff which, as above described, may operate a propeller for moving the vehicle through water, is controlled through the means of a control valve. This valve may be set to condition the power takeoff to drive the vehicle forwardly, or to drive it in reverse, or to condition the power takeoff in neutral. The control valve controls the engagement and disengagement of the brake devices which, in turn, control elements of the power takeoff planetary gear set.

What is claimed is:

1. An apparatus for transmitting driving torque to the traction elements of a vehicle of the type having ground engaging endless tracks on opposite sides thereof and for steering said vehicle comprising, a driving member, torque output members for connection respectively to traction elements on opposite sides of the vehicle, a gear set between the driving member and one torque output member, a gear set between the driving member and the other torque output member, friction engaging devices associated with each gear set and which are selectively engageable to condition the gear sets for transmission of torque at different speed ratios, hydraulic means for actuating the devices, operator actuated control valves movable in unison to a position for introducing hydraulic medium to and for engaging selected devices of both gear sets for the transmission of torque at a relatively high speed ratio, a single movable steering element, a steering valve operable by the steering element to discontinue the supply of hydraulic medium to the engaged device of one gear set for its disengagement while said control valves are in said position, and operable to supply hydraulic medium to another selected device of said one gear set for its engagement for the transmission of torque through said gear set at a lower speed ratio.

2. An apparatus for transmitting driving torque to the traction elements of a vehicle of the type having ground engaging endless tracks on opposite sides thereof and for steering said vehicle comprising, a driving member, torque output members for connection respectively to traction elements on opposite sides of the vehicle, a gear set between the driving member and one torque output member, a gear set between the driving member and the other torque output member, friction engaging devices associated with each gear set and which are selectively engageable to condition the gear sets for transmission of torque at different speed ratios, hydraulic means for actuating the devices, operator actuated control valves for introducing hydraulic medium to and for engaging selected devices of both gear sets for the transmission of torque at a relatively high speed ratio, a movable steering element, a steering valve operable by the steering element to discontinue the supply of hydraulic medium to the engaged device of one gear set for its disengagement, and operable to supply hydraulic medium to another selected device of said one gear set for its engagement for the transmission of torque through said gear set at a lower speed ratio, said steering valve having a pressure regulating port for admitting hydraulic medium to the last named device in a pressure controlled manner depending upon the extent of movement of the steering element, whereby the last named device may be partially engaged so that it slips.

3. An apparatus for transmitting driving torque to the traction elements of a vehicle of the type having ground engaging endless tracks on opposite sides thereof and for steering said vehicle comprising, a driving member, torque output members for connection respectively to traction elements on opposite sides of the vehicle, a gear set between the driving member and one torque output member, a gear set between the driving member and the other torque output member, friction engaging devices associated with each gear set and which are selectively engageable to condition the gear sets for transmission of torque at different speed ratios, hydraulic actuators for the devices, a hydraulic system including pressure lines and exhaust ports, manually controlled valves in the hydraulic system operable for the transmission of hydraulic medium to selected device actuators of both gear sets for the transmission of torque at relatively high speed ratio, a movable steering element, a steering valve in the hydraulic system operable by the steering element to discontinue the supply of hydraulic medium to the actuator of the engaged device of one gear set for its disengagement and for the supply of hydraulic medium to the actuator of another selected device of said one gear set for its engagement for the transmission of torque through said one gear set at a lower speed ratio, a pressure line in the hydraulic system connecting the hydraulic actuator for the last named selected device to the said steering valve so that the pressure thereof acts upon the steering valve in opposition to the movement of the valve by the steering element.

4. An apparatus for transmitting driving torque to the traction elements of a vehicle of the type having ground engaging endless tracks on opposite sides thereof and for steering said vehicle comprising, a driving member, torque output members for connection respectively to traction elements on opposite sides of the vehicle, a gear set between the driving member and one torque output member, a gear set between the driving member and the other torque output member, friction engaging devices associated with each gear set and which are selectively engageable to condition the gear sets for transmission of torque at different speed ratios, hydraulic actuators for the devices, a hydraulic system including pressure lines and exhaust ports, manually controlled valves in the hydraulic system operable for the transmission of hydraulic medium to selected actuators of both gear sets for the transmission of torque at relatively high speed ratio, a movable steering element, a steering valve in the hydraulic system operable by the steering element to discontinue the supply of hydraulic medium to the actuator of the engaged device of one gear set for its disengagement and for the supply of hydraulic medium to the actuator of another selected device of said one gear set for its engagement for the transmission of torque through said one gear set at a lower speed ratio, a pressure line in the hydraulic system connecting the hydraulic actuator for the last named selected device to the said steering valve so that the pressure thereof acts upon the steering valve in opposition to the movement of the valve by the steering element, a port in said steering valve which opens during part of the movement of the steering valve incident to the movement of the steering element for introducing hydraulic medium into the last named pressure line with a direction of flow opposite that of the hydraulic medium introduced into said last named pressure line from the hydraulic actuator of the last named device to thereby stabilize the steering valve.

5. In a transmission apparatus for transmitting driving torque to the traction elements of a vehicle of the type having ground engaging endless tracks on opposite sides thereof and for steering the vehicle, a driving member, two torque output members for connection respectively to the opposite traction elements, a hydraulic control system including pressure lines for hydraulic medium, a plurality of hydraulically actuated elements, control valve means in the hydraulic system operable to transmit hydraulic medium to selected actuated elements for the transmission of torque to the output members at one speed ratio, a movable steering element, a steering valve to which pressure lines of the system connect, said steering valve having a housing and a movable valve member, said valve member being movable by said steering element to discontinue the supply of hydraulic medium to the selected hydraulically actuated element for one output member and to supply hydraulic medium to a second selected hydraulically actuated element for the transmission of torque to said one output member at a different speed ratio to thereby turn the vehicle, a conductor line connecting the said second hydraulically actuated element and a chamber in the housing of the steering valve so that the pressure of the hydraulic medium acts upon the valve member in opposition to the action exerted thereon by the steering element, and a relatively small port in the valve member for introducing hydraulic medium from another pressure line into said chamber with a direction of flow opposite the flow into said chamber through said conductor line to minimize shock on the valve member and stabilize the same.

6. The transmission apparatus as described in claim 5 characterized in that there is another like steering valve with a valve member actuated by the steering element when the steering element is moved in the opposite direction for changing the ratio of the transmission of torque to the other torque output member to turn the vehicle in the opposite direction.

7. In a transmission apparatus for transmitting driving torque to the traction elements of a vehicle of the type having ground engaging endless tracks on opposite sides thereof and for steering the vehicle, a driving member, two torque output members for connection respectively to the opposite traction elements, a hydraulic control system including pressure lines for hydraulic medium, a plurality of hydraulically actuated elements, control valve means in the hydraulic system operable to transmit hydraulic medium to selected actuated elements for the transmission of torque to the output members at one speed ratio, a movable steering element, a pair of steering valves to which pressure lines of the system connect, each steering valve having a housing and a movable valve member, one valve member being movable by the steering element when it shifts in one direction and the other valve member being movable by the steering element when the steering element moves in the other direction, each steering valve, upon movement of its valve member, being operable to discontinue the supply of hydraulic medium to the selected hydraulically actuated element for one output member and to supply hydraulic medium to a second hydraulically actuated element for the transmission of torque to said one output member at a different speed ratio to thereby turn the vehicle, each valve member having a conductor line connecting the said second hydraulically actuated element and a chamber in the housing of the steering valve so that the pressure of the hydraulic medium acts upon the valve member in opposition to the action exerted thereon by the steering element, and a port in each valve member for introducing hydraulic medium from another pressure line, during part of the movement of the valve member, into said chamber with a direction of flow opposite the flow into said chamber from said conductor line to minimize shock on the valve member and to stabilize the same.

8. The transmission apparatus as described in claim 5 characterized in that there are a plurality of springs acting upon the movable valve member in opposition to the force supplied thereto by the movable steering element, and arranged to become effective in sequence as the valve member shifts whereby the resistance to the movement of the steering element increases with increments of movement of the steering element.

9. In a hydraulic steering mechanism for a vehicle, a shiftable steering element, a steering valve having a housing and a movable valve member therein, a main pressure line connecting into the valve, a pressure line extending from the valve to a hydraulically actuated motor having a cylinder operable to effect steering of the vehicle, said valve member being movable by the steering element, port means in the valve for connecting the main pressure line, upon movement of the valve member, to the cylinder of the hydraulically actuated motor, a conductor line extending from the cylinder of the hydraulically actuated motor to a chamber in the valve housing so that the hydraulic medium entering the chamber from the said cylinder acts upon the valve member in a direction opposing the movement exerted thereon by the steering element, and another port means in the valve for introducing hydraulic medium, during part of the movement of the valve member, from the main pressure line into said chamber, with a direction of flow opposite the flow of the hydraulic medium entering the chamber from said cylinder to minimize shock on the valve member and stabilize the same.

10. In a transmission apparatus for transmitting driving torque to the traction elements of a vehicle of the type having ground engaging endless tracks on opposite sides thereof and for steering the vehicle, a driving member, two torque output members for connection respectively to the opposite traction elements, a hydraulic control system including pressure lines for hydraulic medium, a plurality of hydraulically actuated elements, control valve means in the hydraulic system operable to transmit hydraulic medium to selected actuated elements for the transmission of torque to the output members at one speed ratio, and for applying individual brakes to the output members, a movable steering element, a steering valve to which pressure lines of the system connect, said steering valve having a housing and a movable valve member, said movable valve member being movable by said steering element to discontinue the supply of hydraulic medium to the selected hydraulically actuated element for one output member and to supply hydraulic medium to a second selected hydraulically actuated element for applying one of said individual brakes to said one output member to thereby turn the vehicle, a conductor line connecting the said second hydraulically actuated element and a chamber in the housing of the steering valve so that the pressure of the hydraulic medium acts upon the valve member in opposition to the action exerted thereon by the steering element, and a port in the valve member for introducing hydraulic medium from another pressure line into said chamber with a direction of flow opposite the flow into said chamber through said conductor line, to minimize shock on the valve member and stabilize the same.

11. An apparatus for transmitting driving torque to the traction elements of a vehicle of the type having ground engaging endless tracks on opposite sides thereof and for steering said vehicle comprising, a driving member, torque output members for connection respectively to traction elements on opposite sides of the vehicle, a gear set between the driving member and one torque output member, a gear set between the driving member and the other torque output member, friction engaging devices associated with each gear set and which are selectively engageable to condition the gear sets for transmission of torque at different speed ratios, a brake device including engaging friction elements associated with each torque output member, operator controlled means for engaging selected devices of both gear sets for the transmission of torque selectively at a relatively high speed ratio and a relatively low speed ratio, a movable steering element, and steering means operable by the steering element to disengage an engaged device for one gear set which causes transmission of torque at a relatively high speed ratio and to engage another selected device of said one gear set for the transmission of torque through said one gear set at a lower speed ratio for turning the vehicle, said steering means being operable when selected devices are engaged for transmission of torque at relatively low speed ratio through both gear sets to disengage the engaged low speed ratio device of one gear set and to engage the brake device effective upon the torque output member associated with said one gear set to turn the vehicle, means for conducting lubricant under pressure to said brake device as it is slipping in its action of engagement and means for discontinuing the conduction of lubricant under pressure when the brake device is fully engaged.

12. The apparatus as described in claim 11 characterized in that there is a lubricant conducting line leading to each friction brake, a normally closed valve in each line, and means for actuating the valve of each friction brake to open position as the said friction brake is being partially applied and released to thereby lubricate the same.

References Cited in the file of this patent
UNITED STATES PATENTS

| | | |
|---|---|---|
| 1,386,979 | Wickersham | Aug. 9, 1921 |
| 1,413,414 | McDaniels | Apr. 18, 1922 |
| 1,905,952 | Scott | Apr. 25, 1933 |
| 2,088,110 | Lamb | July 27, 1937 |
| 2,267,334 | Keller | Dec. 23, 1941 |
| 2,279,019 | Black | Apr. 7, 1942 |
| 2,407,699 | Hill | Sept. 17, 1946 |
| 2,416,373 | Brown | Feb. 25, 1947 |
| 2,468,628 | Henning | Apr. 26, 1949 |
| 2,490,941 | Bell et al. | Dec. 13, 1949 |
| 2,496,429 | Baker et al. | Feb. 7, 1950 |
| 2,585,790 | Kelley | Feb. 12, 1952 |
| 2,619,201 | Crookston | Nov. 25, 1952 |
| 2,655,054 | Kelley | Oct. 13, 1953 |
| 2,670,828 | McFarland | Mar. 2, 1954 |

FOREIGN PATENTS

| | | |
|---|---|---|
| 514,219 | Germany | Dec. 11, 1930 |
| 407,960 | Great Britain | Mar. 20, 1934 |
| 560,981 | Great Britain | May 1, 1944 |